US012645841B2

(12) United States Patent
Matsumoto et al.

(10) Patent No.: US 12,645,841 B2
(45) Date of Patent: Jun. 2, 2026

(54) DATA MAINTENANCE SYSTEM, DATA MAINTENANCE METHOD, COMPUTER READABLE MEDIUM, AND DATA VERIFICATION APPARATUS

(71) Applicant: Mitsubishi Electric Corporation, Tokyo (JP)

(72) Inventors: Mitsuhiro Matsumoto, Tokyo (JP); Masaya Honjo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 37 days.

(21) Appl. No.: 18/931,982

(22) Filed: Oct. 30, 2024

(65) Prior Publication Data

US 2025/0053691 A1      Feb. 13, 2025

Related U.S. Application Data

(63) Continuation of application No. PCT/JP2022/022844, filed on Jun. 6, 2022.

(51) Int. Cl.
*G06F 21/64* (2013.01)
*G06F 21/60* (2013.01)

(52) U.S. Cl.
CPC ............ *G06F 21/64* (2013.01); *G06F 21/602* (2013.01)

(58) Field of Classification Search
CPC ............................... G06F 21/64; G06F 21/602
See application file for complete search history.

(56) References Cited

U.S. PATENT DOCUMENTS

| | | | |
|---|---|---|---|
| 8,959,067 B1 | 2/2015 | Patiejunas et al. | |
| 9,092,441 B1 | 7/2015 | Patiejunas et al. | |
| 9,250,811 B1 | 2/2016 | Patiejunas | |
| 9,251,097 B1 | 2/2016 | Kumar et al. | |

(Continued)

FOREIGN PATENT DOCUMENTS

| | | |
|---|---|---|
| CN | 112181756 A | 1/2021 |
| EP | 3 805 941 A1 | 4/2021 |

(Continued)

OTHER PUBLICATIONS

International Seaarch Report (PCT/ISA/210) issued in PCT/JP2022/022844, dated Aug. 16, 2022.

(Continued)

*Primary Examiner* — Ayoub Alata
(74) *Attorney, Agent, or Firm* — Birch, Stewart, Kolasch & Birch, LLP

(57) ABSTRACT

A data registration apparatus (200) processes original data saved in a data source and registers the processed data. A data verification apparatus (300) computes a digest value of reference combined data which is generated based on a digest value of the original data and a digest value of the processed data as a reference digest value. The data verification apparatus computes a digest value of the registered processed data as a provisional digest value, retrieves digest value saved in the data source as a provisional digest value, computes a digest value of verification combined data which is generated based on the provisional digest value of the original data and the provisional digest value of the processed data as a verification digest value, and compares the verification digest value with the reference digest value.

11 Claims, 30 Drawing Sheets

(56) References Cited

U.S. PATENT DOCUMENTS

| | | | |
|---|---|---|---|
| 9,465,821 B1 | 10/2016 | Patiejunas et al. | |
| 9,563,681 B1 | 2/2017 | Patiejunas et al. | |
| 9,652,487 B1 | 5/2017 | Patiejunas | |
| 9,779,035 B1 | 10/2017 | Patiejunas | |
| 9,830,111 B1 | 11/2017 | Patiejunas et al. | |
| 10,120,579 B1 | 11/2018 | Patiejunas et al. | |
| 2012/0041931 A1* | 2/2012 | Ross | G06F 21/64 |
| | | | 707/693 |
| 2012/0243170 A1 | 9/2012 | Frink et al. | |
| 2014/0046906 A1 | 2/2014 | Patiejunas et al. | |
| 2014/0046908 A1* | 2/2014 | Patiejunas | G06F 16/2308 |
| | | | 707/687 |
| 2014/0046909 A1 | 2/2014 | Patiejunas et al. | |
| 2014/0047040 A1 | 2/2014 | Patiejunas et al. | |
| 2014/0047261 A1 | 2/2014 | Patiejunas et al. | |
| 2014/0281224 A1 | 9/2014 | Frink et al. | |
| 2015/0161184 A1 | 6/2015 | Patiejunas et al. | |
| 2015/0248568 A1* | 9/2015 | Offenberg | G06F 21/6218 |
| | | | 713/193 |
| 2016/0085797 A1 | 3/2016 | Patiejunas et al. | |
| 2016/0103870 A1 | 4/2016 | Patiejunas et al. | |
| 2016/0154963 A1 | 6/2016 | Kumar et al. | |
| 2016/0350254 A1 | 12/2016 | Frink et al. | |
| 2017/0024428 A1 | 1/2017 | Patiejunas et al. | |
| 2018/0032464 A1 | 2/2018 | Frink et al. | |
| 2018/0157853 A1 | 6/2018 | Kumar et al. | |
| 2019/0165946 A1 | 5/2019 | Unagami et al. | |
| 2019/0171606 A1 | 6/2019 | Frink et al. | |
| 2019/0260763 A1 | 8/2019 | Okabe et al. | |
| 2020/0050774 A1 | 2/2020 | Unagami | |
| 2020/0327113 A1 | 10/2020 | Patiejunas et al. | |
| 2021/0026794 A1 | 1/2021 | Frink et al. | |
| 2021/0105143 A1 | 4/2021 | Unagami et al. | |
| 2022/0269803 A1 | 8/2022 | Kura et al. | |
| 2022/0283987 A1 | 9/2022 | Nakamura | |
| 2022/0292044 A1 | 9/2022 | Frink et al. | |
| 2023/0083454 A1 | 3/2023 | Unagami | |
| 2023/0246849 A1 | 8/2023 | Unagami et al. | |

FOREIGN PATENT DOCUMENTS

| | | | | |
|---|---|---|---|---|
| JP | 2004-259229 A | | | 9/2004 |
| JP | 2006039598 A | * | | 2/2006 |
| JP | 2008-211290 A | | | 9/2008 |
| JP | 2008-312064 A | | | 12/2008 |
| JP | 2010272038 A | * | | 12/2010 |
| JP | 2017-157879 A | | | 9/2017 |
| JP | 2017-207979 A | | | 11/2017 |
| JP | 2018-78373 A | | | 5/2018 |
| JP | 2018-196108 A | | | 12/2018 |
| JP | 6463796 B2 | | | 2/2019 |
| JP | 2019-144752 A | | | 8/2019 |
| JP | 2020-24376 A | | | 2/2020 |
| JP | 2020-202442 A | | | 12/2020 |
| JP | 2021-43674 A | | | 3/2021 |
| JP | 2021-87100 A | | | 6/2021 |
| WO | WO 2021/014595 A1 | | | 1/2021 |

OTHER PUBLICATIONS

Office Action issued in Taiwanese Application No. 111136722, dated Nov. 30, 2023.

Indian Office Action and Search Report for Indian Application No. 202447083158, dated Jan. 5, 2026, with English translation.

Breitinger et al., "Approximate Matching: Definition and Terminology," NIST Special Publication 800-168, May 2014, 20 pages total.

German Office Action for German Application No. 11 2022 006 994.5, dated Oct. 10, 2025, with English translation.

* cited by examiner

Figure 26:
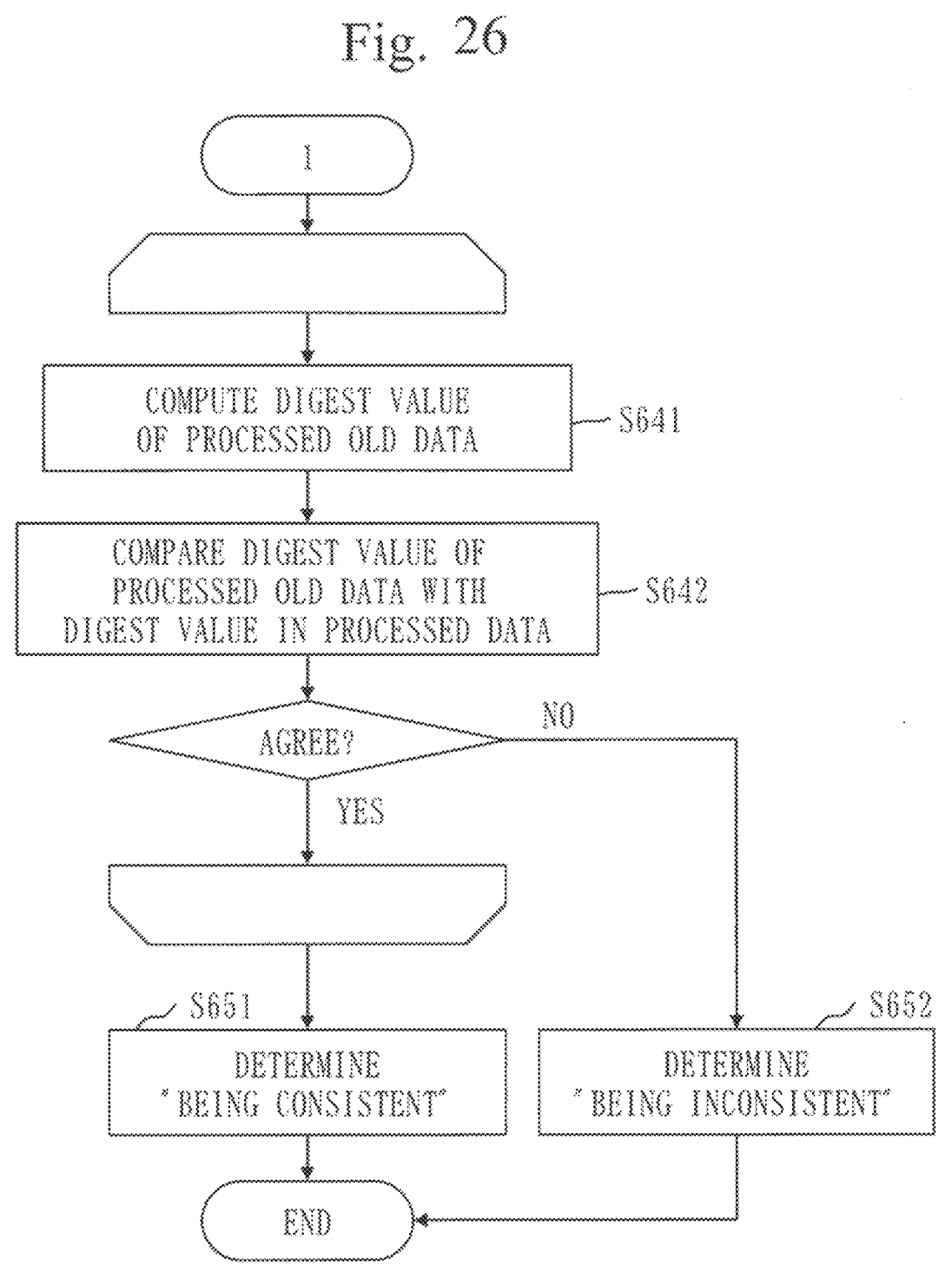

```
                    ┌──────────────┐
                    │      1       │
                    └──────┬───────┘
                           │
                    ┌──────┴───────┐
                    │              │
                    └──────┬───────┘
                           │
         ┌─────────────────┴─────────────────┐
         │   COMPUTE DIGEST VALUE            │──── S641
         │   OF PROCESSED OLD DATA           │
         └─────────────────┬─────────────────┘
                           │
         ┌─────────────────┴─────────────────┐
         │  COMPARE DIGEST VALUE OF          │
         │  PROCESSED OLD DATA WITH          │──── S642
         │  DIGEST VALUE IN PROCESSED DATA   │
         └─────────────────┬─────────────────┘
                           │
                      ◇ AGREE? ◇ ───────── NO
                           │
                          YES              │
                           │               │
                    ┌──────┴───────┐       │
                    │              │       │
                    └──────┬───────┘       │
                           │               │
    S651 ┌─────────────────┴──────┐   ┌────┴──────────────────┐ S652
         │      DETERMINE         │   │      DETERMINE         │
         │  "BEING CONSISTENT"    │   │  "BEING INCONSISTENT"  │
         └──────────┬─────────────┘   └────┬──────────────────┘
                    │                      │
              ┌─────┴──────┐               │
              │    END     │◄──────────────┘
              └────────────┘
```

Fig.28

DATA MAINTENANCE SYSTEM, DATA MAINTENANCE METHOD, COMPUTER READABLE MEDIUM, AND DATA VERIFICATION APPARATUS

CROSS REFERENCE TO RELATED APPLICATION

This application is a Continuation of PCT International Application No. PCT/JP2022/022844, filed on Jun. 6, 2022, which is hereby expressly incorporated by reference into the present application.

TECHNICAL FIELD

The present disclosure relates to techniques for maintaining data.

BACKGROUND ART

Data backup systems using magnetic tape have been traditionally used for storing a large amount of data inexpensively.

However, data recording systems have not provided sufficient security, reliability, and scalability. For example, data compression and error correction are insufficient.

Patent Literature 1 discloses an archival data recording system.

The system solves the issues outlined above through optimization of job planning, detection of data corruption on a data plane, and error detection on a metadata plane.

Specifically, data is divided into a number of sub-parts and a root digest which is an aggregation of digest values is retained. This guarantees the authenticity of data.

CITATION LIST

Patent Literature

Patent Literature 1: JP 6463796

SUMMARY OF INVENTION

Technical Problem

A conventional data maintenance system computes a digest value of data and compares the computed digest value with a digest value from a data source in order to ensure the authenticity of the data. By doing so, the data maintenance system verifies that it possesses the same data as the data in the data source.

However, in cases where part of data is saved or processed data is saved, a conventional data maintenance system cannot ensure that the saved data is data derived from the data source.

An object of the present disclosure is to enable verification of whether registered data is data derived from data in a data source when data from the data source is processed and registered.

Solution to Problem

A data maintenance system according to the present disclosure includes:

a data processing unit to retrieve original data saved in a data source, to process the retrieved original data, and to register obtained processed data;

a reference digest value computation unit to, during registration of the processed data, compute a digest value of the retrieved original data and a digest value of the processed data, to generate reference combined data by combining the computed digest values, and to compute a digest value of the reference combined data as a reference digest value;

a provisional digest value computation unit to compute a digest value of the registered processed data as a provisional digest value during verification of the processed data; and a data verification unit to retrieve the digest value that is saved in the data source as the digest value of the original data as a provisional digest value, to generate verification combined data by combining the provisional digest value of the original data and the provisional digest value of the processed data, to compute a digest value of the verification combined data as a verification digest value, to compare the verification digest value with the reference digest value, and to determine whether the registered processed data is data derived from the original data in the data source.

Advantageous Effects of Invention

According to the present disclosure, it can be verified whether registered data is data derived from data in a data source when data from the data source is processed and registered.

BRIEF DESCRIPTION OF DRAWINGS

FIG. 14 schematically illustrates a data maintenance method in Embodiment 2.

FIG. 17 schematically illustrates a data maintenance method in Embodiment 3.

FIG. 20 schematically illustrates a data maintenance method in Embodiment 4.

FIG. 23 schematically illustrates a data maintenance method in Embodiment 5.

FIG. 26 is the flowchart of the consistency verification process in Embodiment 6.

FIG. 28 schematically illustrates the data maintenance method in Embodiment 6.

DESCRIPTION OF EMBODIMENTS

Figure 1:
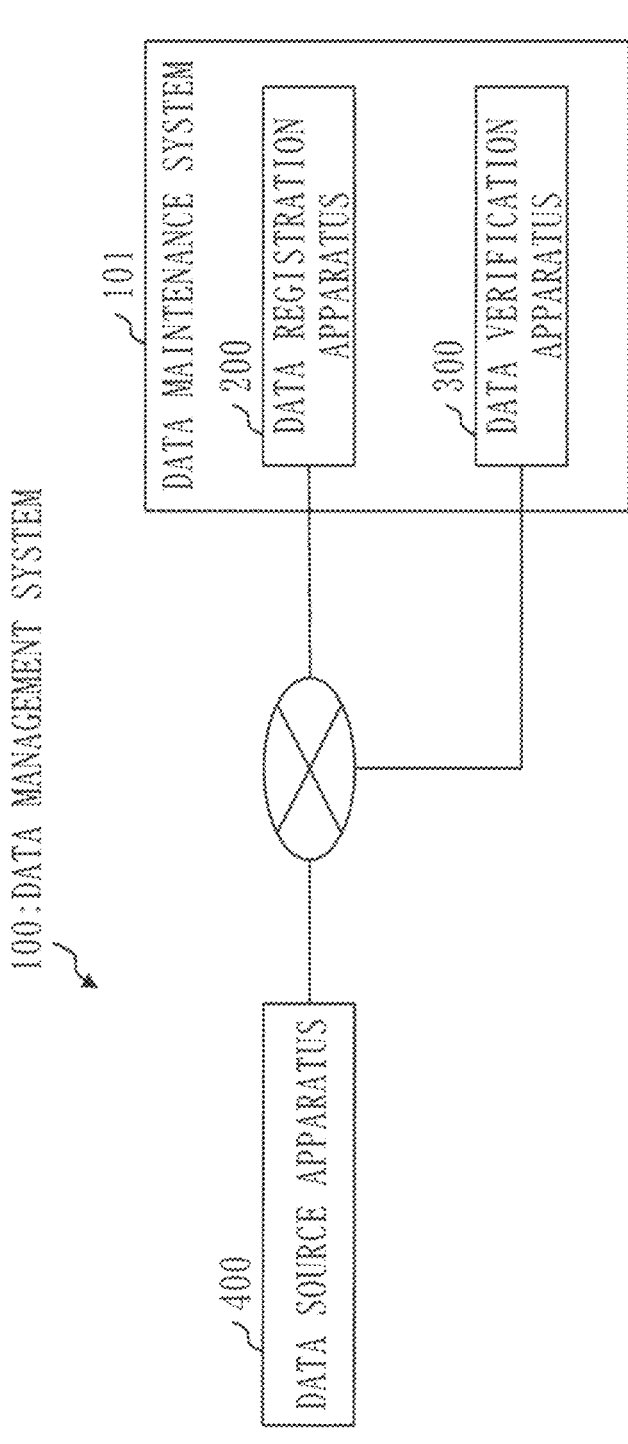
FIG. 1 shows a configuration of a data management system 100 in Embodiment 1.

In the embodiments and drawings, the same or corresponding elements are denoted with the same reference numerals. Description on elements with the same reference numerals as already described elements are omitted or simplified as appropriate. Arrows in the drawings primarily indicate a flow of data or flow of processing.

Embodiment 1

A data management system 100 will be described based on FIGS. 1 to 9.
*Descriptions of Configuration*
With reference to FIG. 1, a configuration of the data management system 100 is described.

The data management system 100 includes a data maintenance system 101 and a data source apparatus 400.

The data maintenance system 101 includes a data registration apparatus 200 and a data verification apparatus 300.

The data registration apparatus 200, the data verification apparatus 300, and the data source apparatus 400 communicate with each other over a network.

Figure 2:
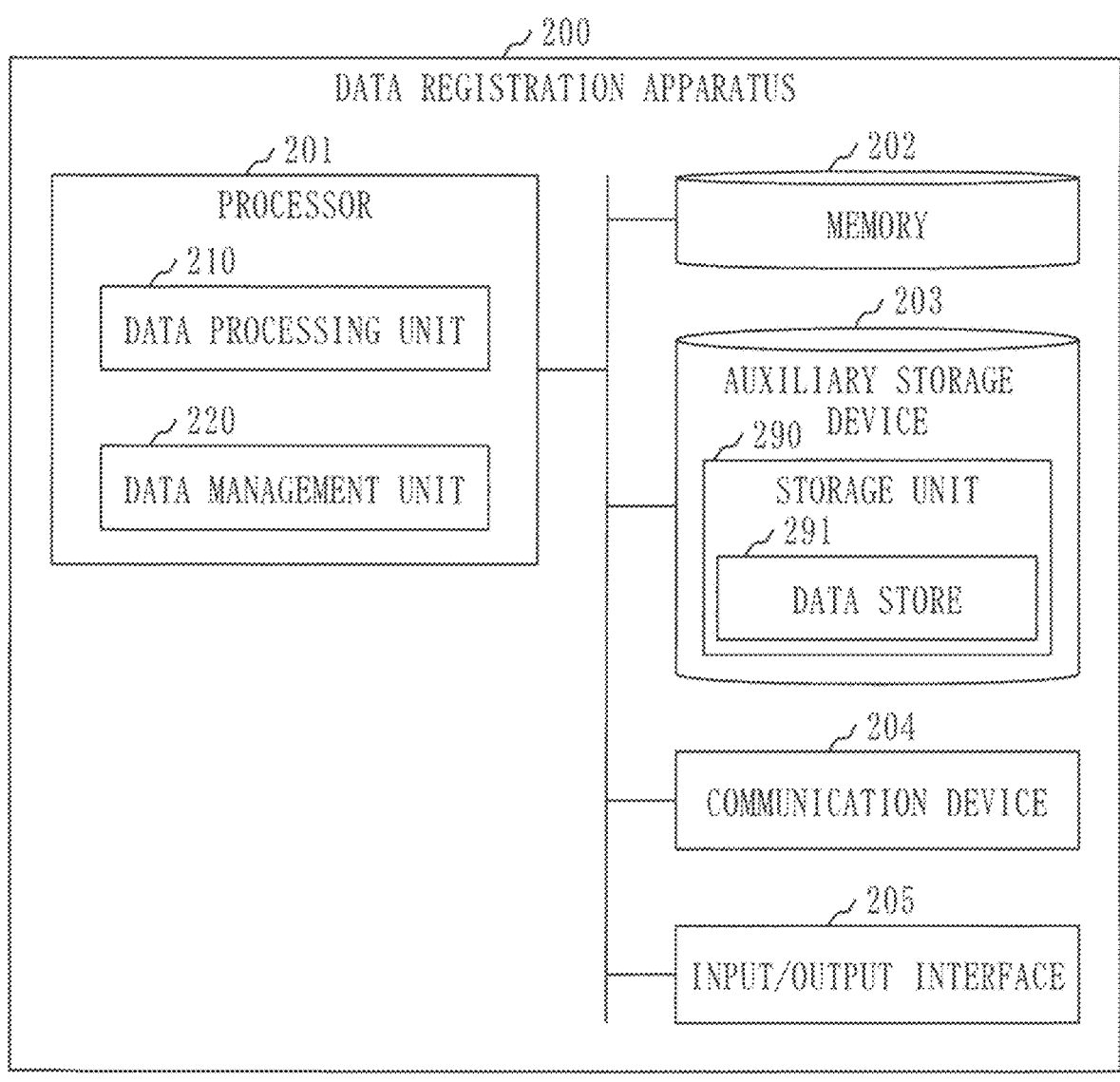
FIG. 2 shows a configuration of a data registration apparatus 200 in Embodiment 1.

With reference to FIG. 2, a configuration of the data registration apparatus 200 is described.

The data registration apparatus 200 is a computer having pieces of hardware such as a processor 201, a memory 202, an auxiliary storage device 203, a communication device 204, and an input/output interface 205. These pieces of hardware are interconnected via signal lines.

The processor 201 is an IC to perform arithmetic processing and controls the other pieces of hardware. The processor 201 is a CPU, for example.

IC is an abbreviation for Integrated Circuit.

CPU is an abbreviation for Central Processing Unit.

The memory 202 is a volatile or non-volatile storage device. The memory 202 is also called a main storage device or main memory. The memory 202 is a RAM, for example. Data stored in the memory 202 is saved in the auxiliary storage device 203 as needed.

RAM is an abbreviation for Random Access Memory.

The auxiliary storage device 203 is a non-volatile storage device. The auxiliary storage device 203 is a ROM, an HDD, flash memory, or a combination thereof, for example. Data stored in the auxiliary storage device 203 is loaded into the memory 202 as needed.

ROM is an abbreviation for Read Only Memory.

HDD is an abbreviation for Hard Disk Drive.

The communication device 204 is a receiver and a transmitter. The communication device 204 is a communication chip or a NIC, for example. Communications of the data registration apparatus 200 are performed using the communication device 204.

NIC is an abbreviation for Network Interface Card.

The input/output interface 205 is ports to which input devices and output devices are connected. For example, the input/output interface 205 is USB terminals, the input device is a keyboard and a mouse, and the output device is a display. Input and output of the data registration apparatus 200 are performed using the input/output interface 205.

USB is an abbreviation for Universal Serial Bus.

The data registration apparatus 200 includes elements called a data processing unit 210 and a data management unit 220. These elements are implemented in software.

The auxiliary storage device 203 has stored therein a data registration program for causing a computer to function as the data processing unit 210 and the data management unit 220. The data registration program is loaded into the memory 202 and executed by the processor 201.

The auxiliary storage device 203 further stores an OS therein. At least part of the OS is loaded into the memory 202 and executed by the processor 201.

The processor 201 executes the data registration program while running the OS.

OS is an abbreviation for Operating System.

Input and output data for the data registration program is stored in a storage unit 290.

The auxiliary storage device 203 functions as the storage unit 290. However, a storage device such as the memory 202, a register in the processor 201, and cache memory in the processor 201 may function as the storage unit 290 in place of or in conjunction with the auxiliary storage device 203.

The storage unit 290 functions as a data store 291.

The data registration apparatus 200 may also include multiple processors to replace the processor 201.

The data registration program can be recorded (stored) on a non-volatile recording medium such as an optical disk or flash memory in a computer-readable manner.

Figure 3:
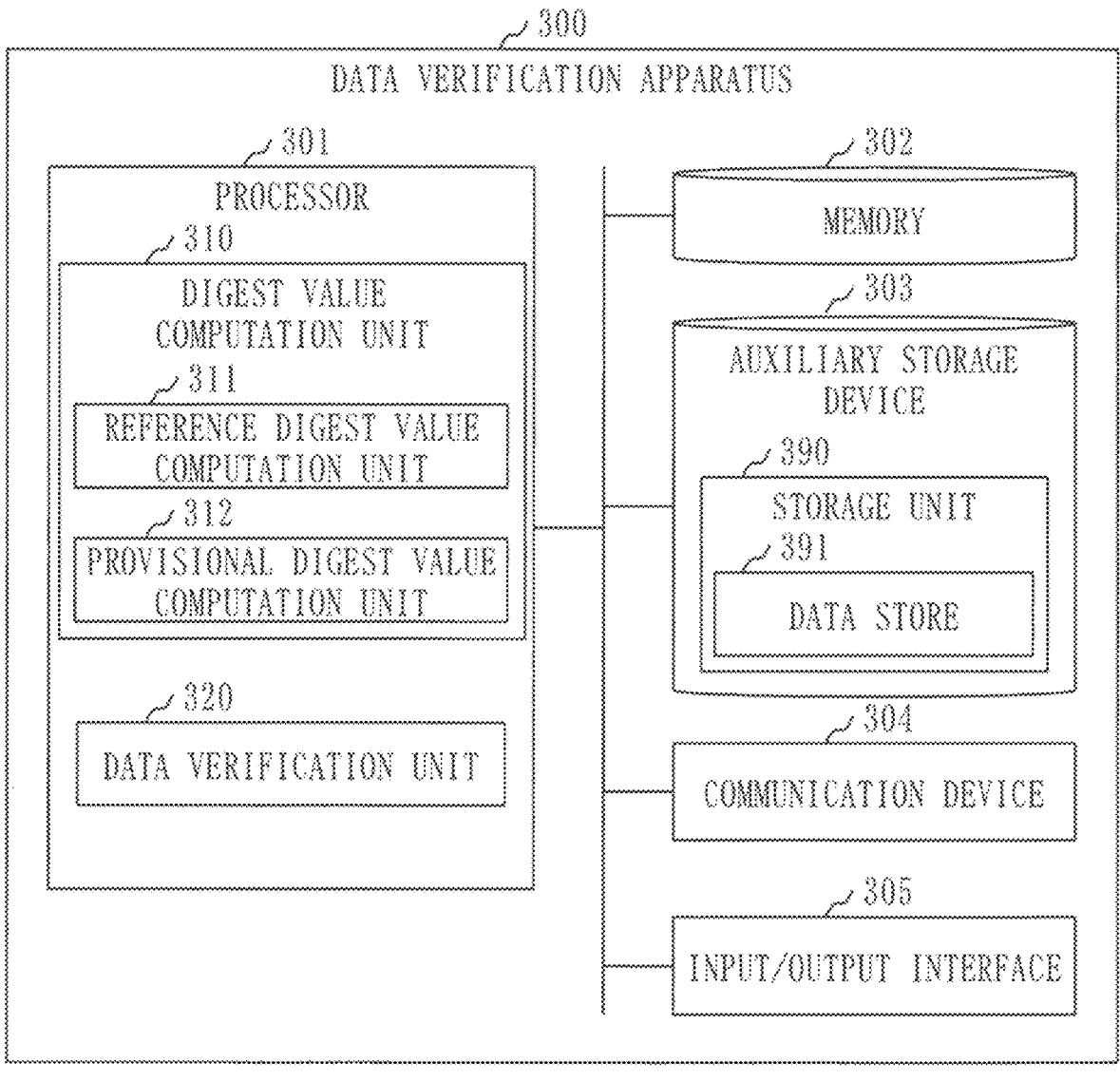
FIG. 3 shows a configuration of a data verification apparatus 300 in Embodiment 1.

With reference to FIG. 3, a configuration of the data verification apparatus 300 is described.

The data verification apparatus 300 is a computer having pieces of hardware such as a processor 301, a memory 302, an auxiliary storage device 303, a communication device 304, and an input/output interface 305. These pieces of hardware are interconnected via signal lines.

The processor 301 is an IC to perform arithmetic processing and controls the other pieces of hardware. The processor 301 is a CPU, for example.

The memory 302 is a volatile or non-volatile storage device. The memory 302 is also called a main storage device or main memory. The memory 302 is a RAM, for example.

Data stored in the memory 302 is saved in the auxiliary storage device 303 as needed.

The auxiliary storage device 303 is a non-volatile storage device. The auxiliary storage device 303 is a ROM, an HDD, flash memory, or a combination thereof, for example. Data stored in the auxiliary storage device 303 is loaded into the memory 302 as needed.

The communication device 304 is a receiver and a transmitter. The communication device 304 is a communication chip or a NIC, for example. Communications of the data verification apparatus 300 are performed using the communication device 304.

The input/output interface 305 is ports to which input devices and output devices are connected. For example, the input/output interface 305 is USB terminals, the input device is a keyboard and a mouse, and the output device is a display. Input and output of the data verification apparatus 300 are performed using the input/output interface 305.

The data verification apparatus 300 includes elements such as a digest value computation unit 310 and a data verification unit 320. These elements are implemented in software.

The digest value computation unit 310 includes a reference digest value computation unit 311 and a provisional digest value computation unit 312.

The auxiliary storage device 303 has stored therein a data verification program for causing a computer to function as the digest value computation unit 310 and the data verification unit 320. The data verification program is loaded into the memory 302 and executed by the processor 301.

The auxiliary storage device 303 further stores an OS therein. At least part of the OS is loaded into the memory 302 and executed by the processor 301.

The processor 301 executes the data verification program while running the OS.

Input and output data for the data verification program is stored in a storage unit 390.

The auxiliary storage device 303 functions as the storage unit 390. However, a storage device such as the memory 302, a register in the processor 301, and cache memory in the processor 301 may function as the storage unit 390 in place of or in conjunction with the auxiliary storage device 303.

The storage unit 390 functions as a data store 391.

The data verification apparatus 300 may also include multiple processors to replace the processor 301.

The data verification program can be recorded (stored) on a non-volatile recording medium such as an optical disk or flash memory in a computer-readable manner.

Figure 4:
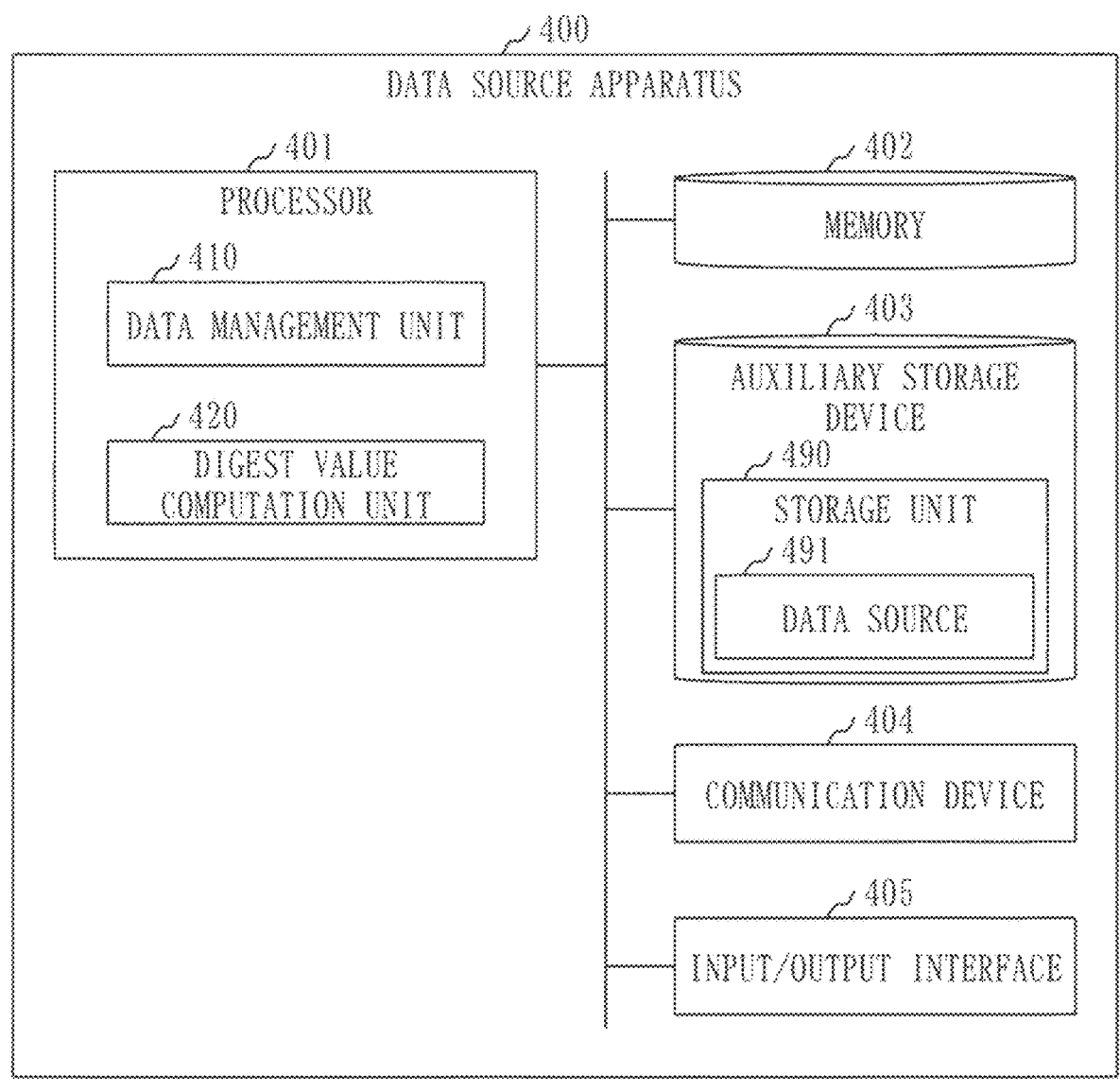
FIG. 4 shows a configuration of a data source apparatus 400 in Embodiment 1.

With reference to FIG. 4, a configuration of the data source apparatus 400 is described.

The data source apparatus 400 is a computer having pieces of hardware such as a processor 401, a memory 402, an auxiliary storage device 403, a communication device 404, and an input/output interface 405. These pieces of hardware are interconnected via signal lines.

The processor 401 is an IC to perform arithmetic processing and controls the other pieces of hardware. The processor 401 is a CPU, for example.

The memory 402 is a volatile or non-volatile storage device. The memory 402 is also called a main storage device or main memory. The memory 402 is a RAM, for example. Data stored in the memory 402 is saved in the auxiliary storage device 403 as needed.

The auxiliary storage device 403 is a non-volatile storage device. The auxiliary storage device 403 is a ROM, an HDD, flash memory, or a combination thereof, for example. Data stored in the auxiliary storage device 403 is loaded into the memory 402 as needed.

The communication device 404 is a receiver and a transmitter. The communication device 404 is a communication chip or a NIC, for example. Communications of the data source apparatus 400 are performed using the communication device 404.

The input/output interface 405 is ports to which input devices and output devices are connected. For example, the input/output interface 405 is USB terminals, the input device is a keyboard and a mouse, and the output device is a display. Input and output of the data source apparatus 400 are performed using the input/output interface 405.

The data source apparatus 400 includes elements such as a data management unit 410 and a digest value computation unit 420. These elements are implemented in software.

The auxiliary storage device 403 has stored therein a data source program for causing a computer to function as the data management unit 410 and the digest value computation unit 420. The data source program is loaded into the memory 402 and executed by the processor 401.

The auxiliary storage device 403 further stores an OS therein. At least part of the OS is loaded into the memory 402 and executed by the processor 401.

The processor 401 executes the data source program while running the OS.

Input and output data for the data source program is stored in a storage unit 490.

The auxiliary storage device 403 functions as the storage unit 490. However, a storage device such as the memory 402, a register in the processor 401, and cache memory in the processor 401 may function as the storage unit 490 in place of or in conjunction with the auxiliary storage device 403.

The storage unit 490 functions as a data source 491.

The data source apparatus 400 may also include multiple processors to replace the processor 401.

The data source program can be recorded (stored) on a non-volatile recording medium such as an optical disk or flash memory in a computer-readable manner.

\*\*\*Description of Operation\*\*\*

An operational procedure of the data management system 100 corresponds to a data management method. The operational procedure of the data management system 100 also corresponds to a procedure of processing by a data management program.

An operational procedure of the data maintenance system 101 corresponds to a data maintenance method. The operational procedure of the data maintenance system 101 also corresponds to a procedure of processing by a data maintenance program.

The data maintenance method is a portion of the data management method.

Figure 5:
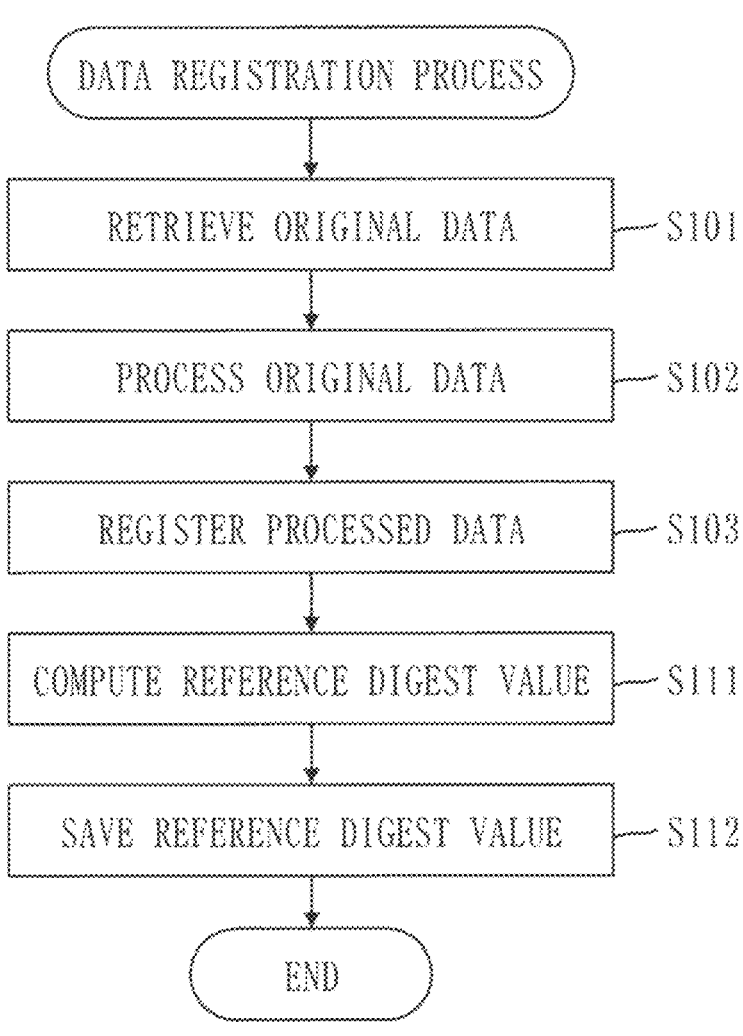
FIG. 5 is a flowchart of a data registration process in Embodiment 1.
Figure 6:
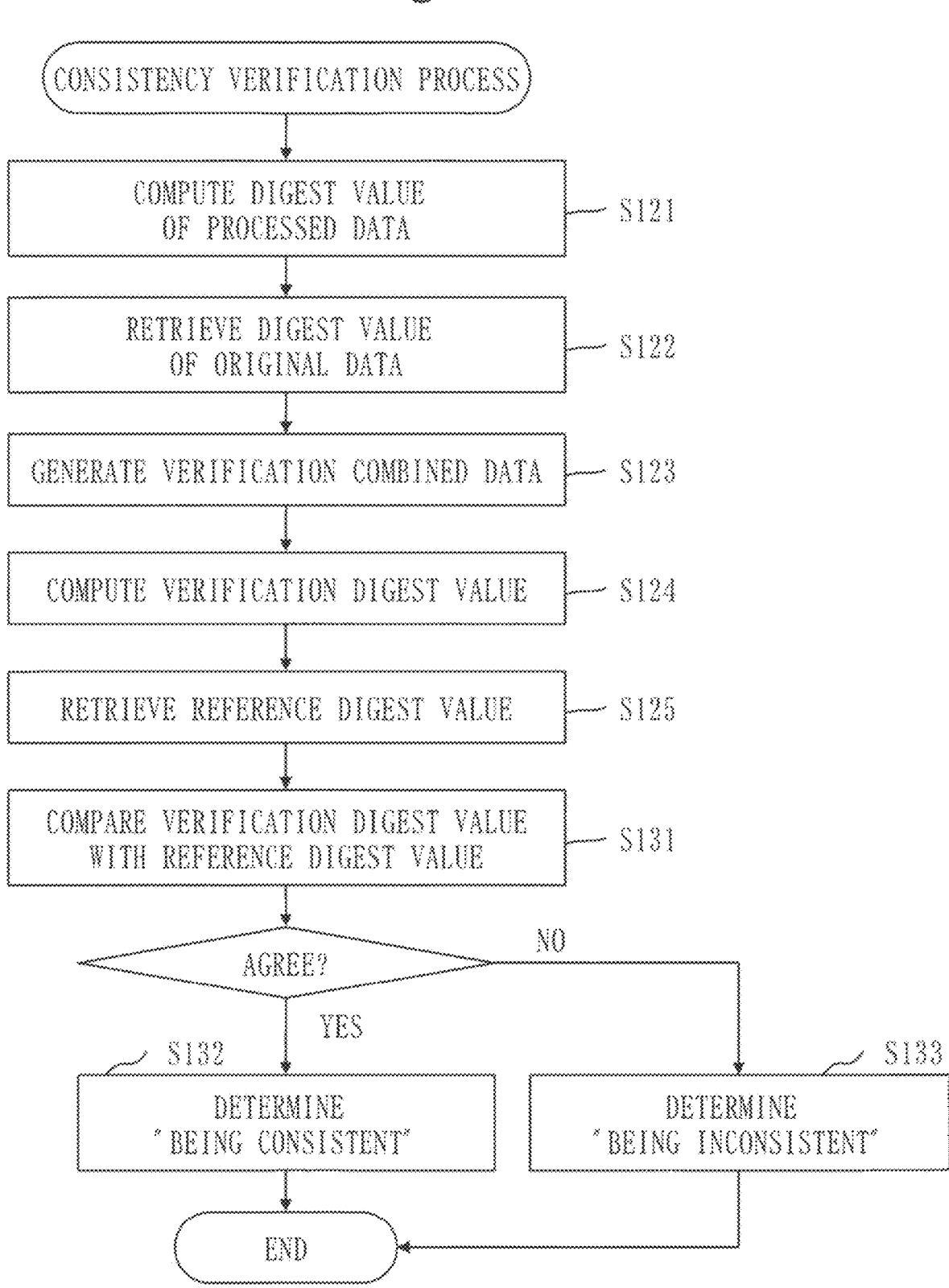
FIG. 6 is a flowchart of a consistency verification process in Embodiment 1.
Figure 7:
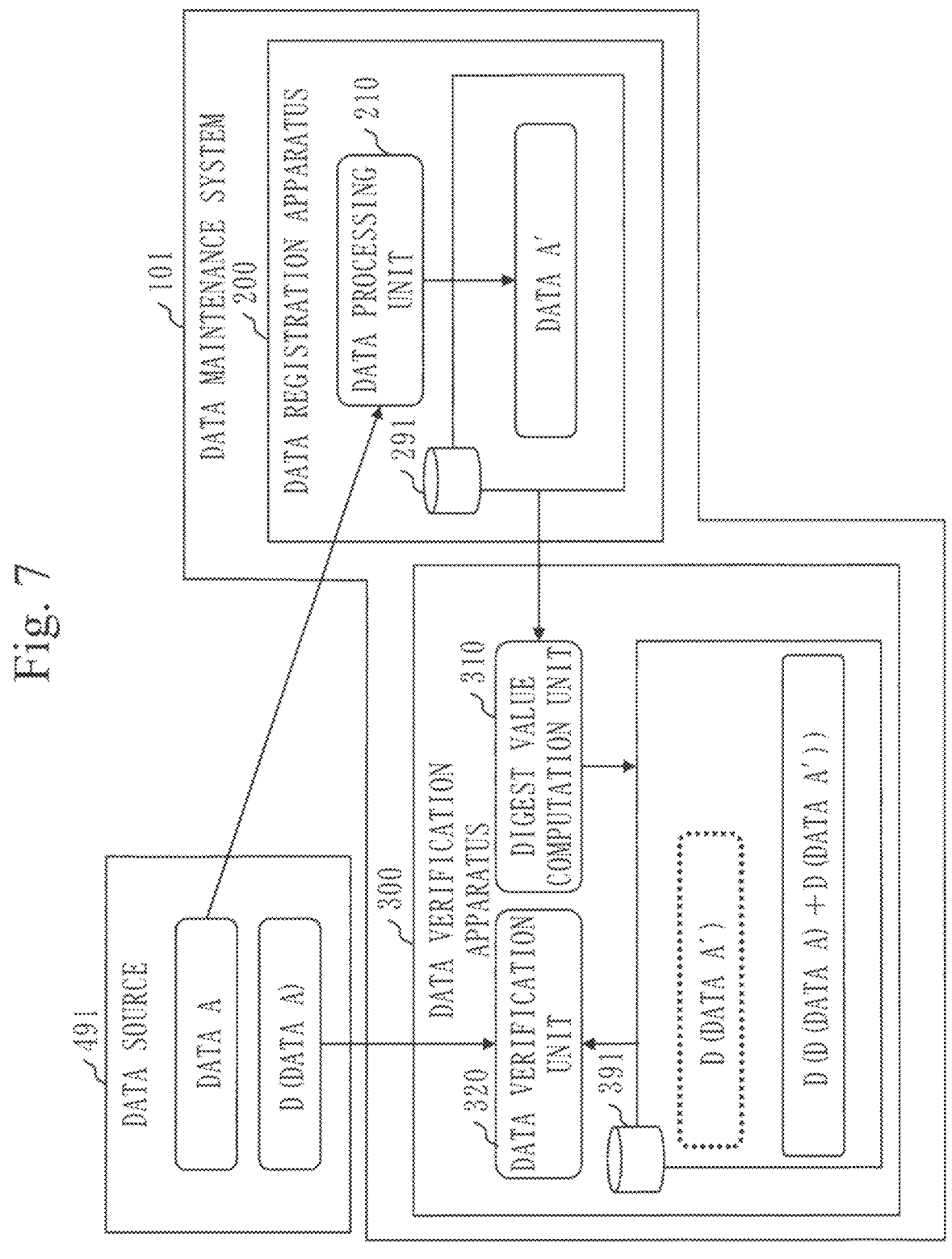
FIG. 7 schematically illustrates a data maintenance method in Embodiment 1.

With reference to FIGS. 5 to 7, the data management method will be described.

In the data source 491, original data and a digest value of the original data have been saved. The digest value of the original data is computed by the digest value computation unit 420.

With reference to FIG. 5, a data registration process is described.

The data registration process is a process that is performed in the data management method.

In step S101, the data processing unit 210 retrieves the original data saved in the data source 491.

For instance, the data management unit 410 reads the original data from the data source 491 and transmits the original data to the data registration apparatus 200. The data processing unit 210 then receives the original data.

In FIG. 7, data A is the original data, saved in the data source 491.

The data processing unit 210 retrieves data A saved in the data source 491.

Referring back to FIG. 5, step S102 and the following steps will be described.

In step S102, the data processing unit 210 processes the retrieved original data.

Specifically, the data processing unit 210 executes a data processing program on the original data as input.

This provides processed data. The processed data is the original data after being processed.

In step S103, the data processing unit 210 registers the processed data in the data store 291.

In FIG. 7, data A' is the processed data for data A and is saved in the data store 291.

Referring back to FIG. 5, step S111 and the following step will be described.

In step S111, the reference digest value computation unit 311 retrieves the original data and the processed data.

For example, the data management unit 220 transmits the original data and the processed data to the data verification apparatus 300. The reference digest value computation unit 311 then receives the original data and the processed data.

The reference digest value computation unit 311 then computes a reference digest value using the original data and the processed data.

The reference digest value is computed in the following manner.

The reference digest value computation unit 311 first computes a digest value of the original data.

The reference digest value computation unit 311 also computes a digest value of the processed data.

Next, the reference digest value computation unit 311 combines the digest value of the original data with the digest value of the processed data to generate combined data. The combined data thus generated is referred to as reference combined data.

The reference combined data may be computed in a way other than the one described above. For example, the original data and the processed data may be combined to generate combined data and a digest value of the combined data may be computed as the reference combined data. Also, four arithmetic operations may be used instead of combining.

The reference combined data may be computed in any manner as long as it ensures the uniqueness of the reference combined data. The way of computation does not matter as long as the reference combined data is a digest value computed using the original data and the processed data.

The reference digest value computation unit 311 then computes a digest value of the reference combined data. The computed digest value is the reference digest value.

In step S112, the reference digest value computation unit 311 saves the reference digest value in the data store 391.

In FIG. 7, D(D(data A)+D(data A')) is the reference digest value, saved in the data store 391. D(data A)+D(data A') is the reference combined data. D(data A) is the digest value of data A, and D(data A') is the digest value of data A'.

With reference to FIG. 6, a consistency verification process is described.

The consistency verification process is a process that is performed in the data management method.

In step S121, the provisional digest value computation unit 312 retrieves the processed data registered in the data store 291.

For example, the provisional digest value computation unit 312 transmits a data request to the data registration apparatus 200. The data management unit 220 receives the data request, reads the processed data from the data store 291, and sends the processed data to the data verification apparatus 300. The provisional digest value computation unit 312 then receives the processed data.

The provisional digest value computation unit 312 then computes a digest value of the processed data. The computed digest value is referred to as a provisional digest value.

In FIG. 7, D(data A') is the provisional digest value of the processed data.

Referring back to FIG. 6, step S122 and the following steps will be described.

In step S122, the data verification unit 320 retrieves the digest value of the original data, which is the digest value saved in the data source 491.

For example, the data verification unit 320 sends a digest value request to the data source apparatus 400. The data management unit 410 receives the digest value request, reads the digest value of the original data from the data source 491, and transmits the digest value of the original data to the data verification apparatus 300. The data verification unit 320 then receives the digest value of the original data.

The retrieved digest value is referred to as a provisional digest value.

In FIG. 7, D(data A) is the digest value of data A, saved in the data source 491.

The data verification unit 320 retrieves D(data A) saved in the data source 491.

In FIG. 7, D(data A) is saved in the data source 491. However, only data A may be present in the data source 491. In that case, the data verification unit 320 would retrieve data A and compute D(data A) using the retrieved data A.

Referring back to FIG. 6, step S123 and the following steps will be described.

In step S123, the data verification unit 320 combines the provisional digest value of the original data with the provisional digest value of the processed data to generate combined data.

The generated combined data is referred to as verification combined data.

In step S124, the data verification unit 320 computes a digest value of the verification combined data.

The computed digest value is referred to as a verification digest value.

In step S125, the data verification unit 320 retrieves the reference digest value saved in the data store 391.

Specifically, the data verification unit 320 reads the reference digest value from the data store 391.

In FIG. 7, D(D(data A)+D(data A')) is the reference digest value, saved in the data store 391.

The data verification unit 320 retrieves the reference digest value saved in the data store 391.

Referring back to FIG. 6, step S131 and the following steps will be described.

In step S131, the data verification unit 320 compares the verification digest value with the reference digest value.

If the verification digest value agrees with the reference digest value, processing proceeds to step S132.

If the verification digest value does not agree with the reference digest value, processing proceeds to step S133.

In step S132, the data verification unit 320 determines "being consistent".

"Being consistent" means that the processed data registered in the data store 291 is data derived from the original data in the data source 491.

The data verification unit 320 then outputs a determination result indicating "being consistent". For example, the data verification unit 320 shows the determination result on a display.

In step S133, the data verification unit 320 determines "being inconsistent".

"Being inconsistent" means that the processed data registered in the data store 291 is not data derived from the original data in the data source 491. For example, "being inconsistent" indicates that the processed data registered in the data store 291 is tampered data.

The data verification unit 320 then outputs a determination result indicating "being inconsistent". For example, the data verification unit 320 shows the determination result on a display.

Effects of Embodiment 1

Figure 8:
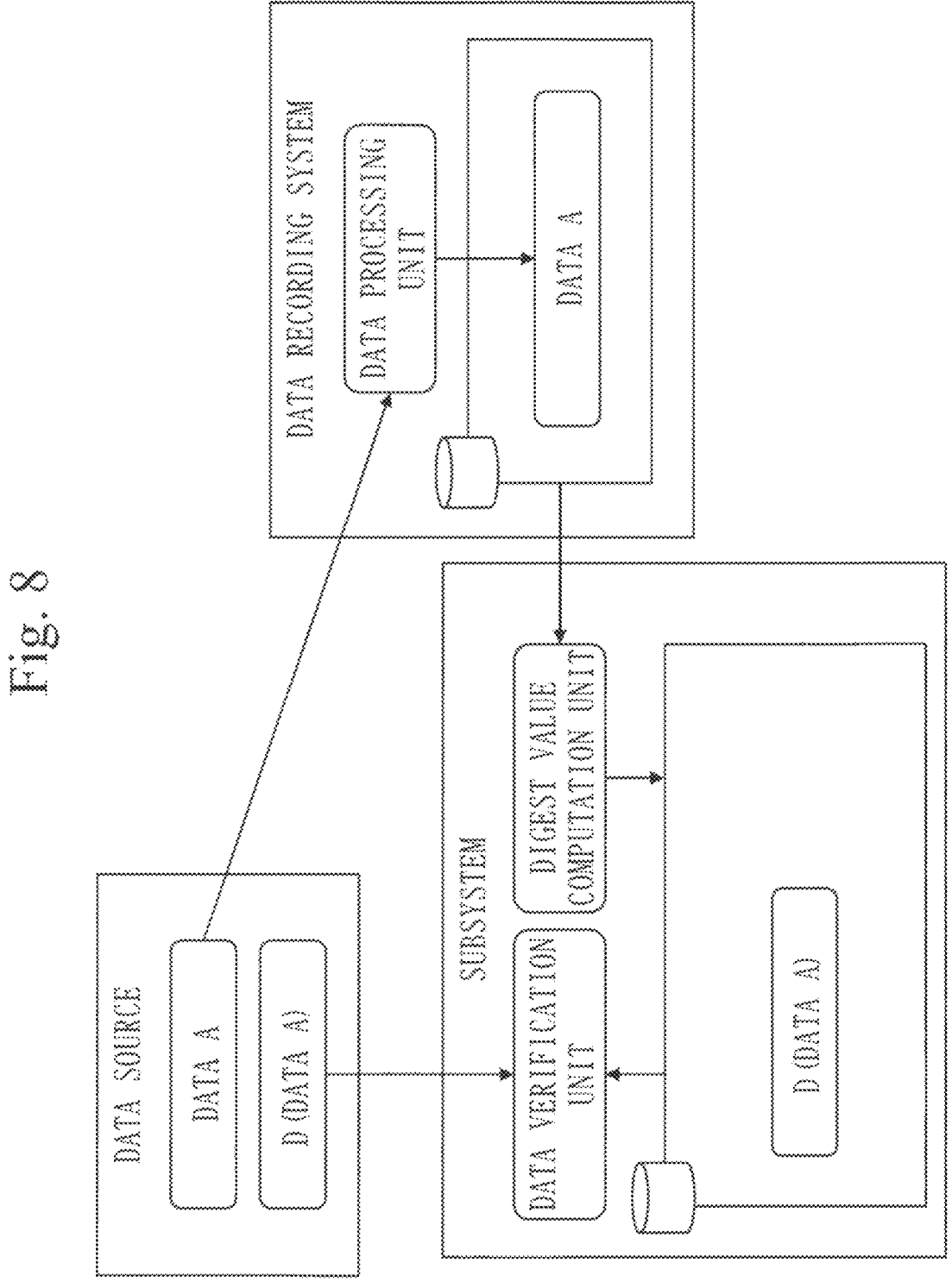
FIG. 8 schematically illustrates a data maintenance method according to a conventional technique.
Figure 9:
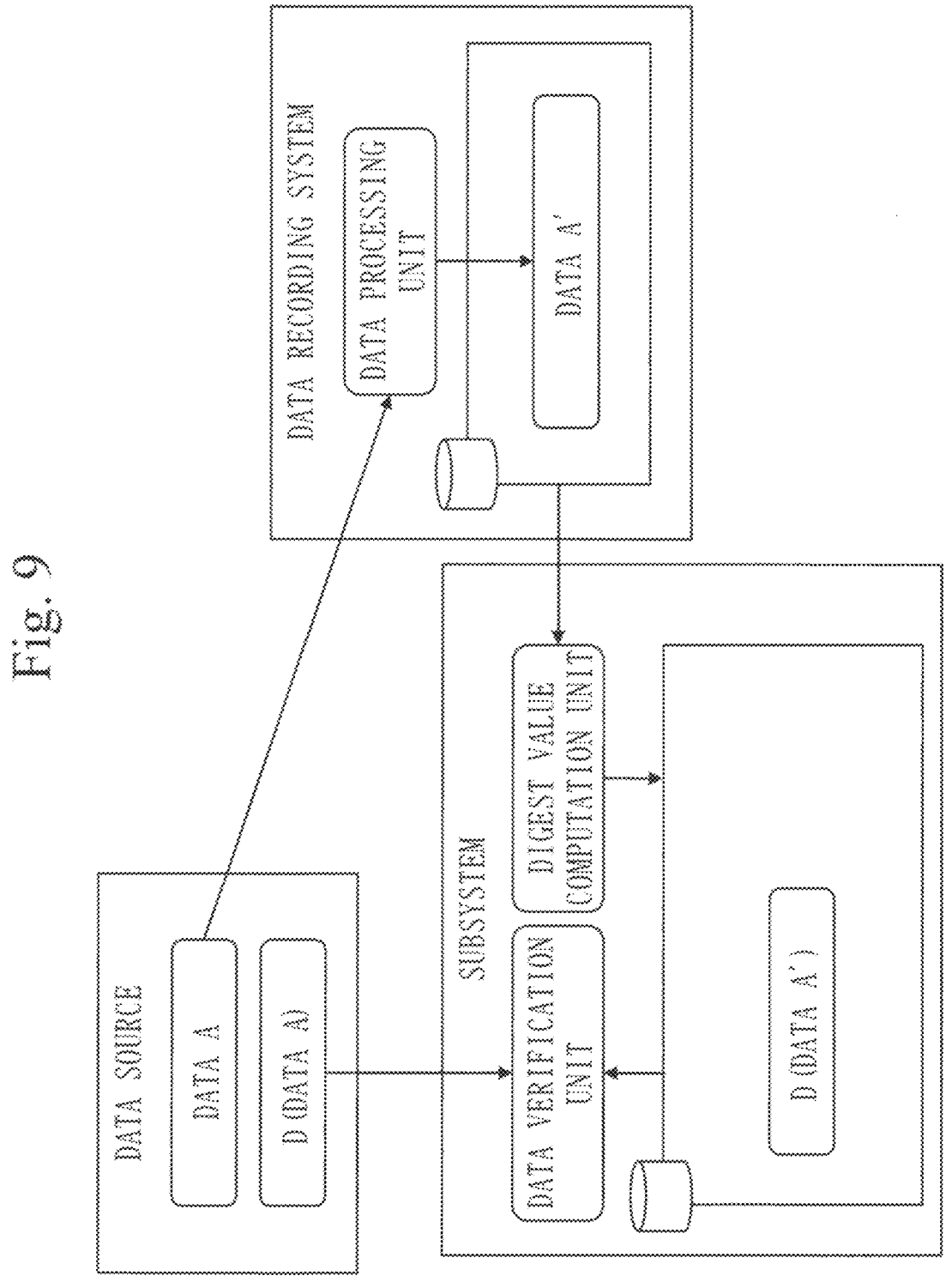
FIG. 9 illustrates issues of the data maintenance method according to the conventional technique.

With reference to FIGS. 7 to 9, effects of Embodiment 1 are described.

FIGS. 8 and 9 show a conventional data maintenance system. The conventional data maintenance system verifies that registered data A agrees with data A in the data source by comparing the digest values D of data A (see FIG. 8). However, if part of data A or converted data A is registered, the conventional data maintenance system is unable to verify that the registered data A' is data derived from data A in the data source.

FIG. 7 shows the data maintenance system 101. The data maintenance system 101 saves a digest value D(D(data A)+D(data A')) (hereinafter called DD) of combined data generated with the digest value D of data A and the digest value D of data A'. During data verification, the data maintenance system 101 retrieves the digest value D of data A from the data source 491, computes the digest value D of the registered data A', and computes the digest value DD of the combined data. The data maintenance system 101 then compares the computed digest value DD with the saved digest value DD, thereby verifying that the registered data A' is data derived from data A in the data source 491.

If data A' is tampered with, the digest value D of data A' changes and hence the digest value DD does not agree during verification.

That is, by saving the digest value DD, the data maintenance system 101 can verify that the registered data A' is data derived from data A in the data source 491.

It is desirable to save the digest value DD in an area where tampering is difficult, because tampering of the saved digest value DD makes detection of tampering of data A' impossible.

Embodiment 2

Figure 10:
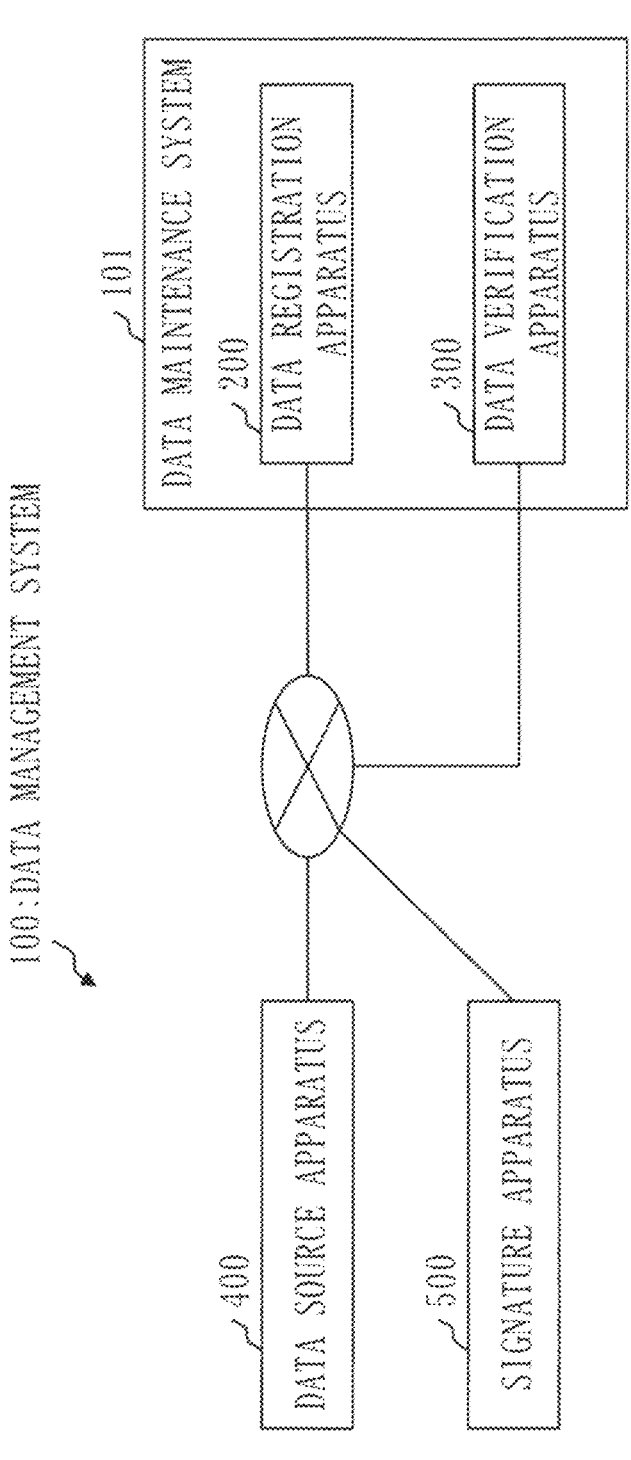
FIG. 10 shows a configuration of the data management system 100 in Embodiment 2.

An arrangement for securely managing a reference digest value will be described with reference to FIGS. 10 to 14 primarily in terms of differences from Embodiment 1.
\*\*\*Description of Configuration\*\*\*
With reference to FIG. 10, the configuration of the data management system 100 is described.

The data management system 100 further includes a signature apparatus 500.

Figure 11:
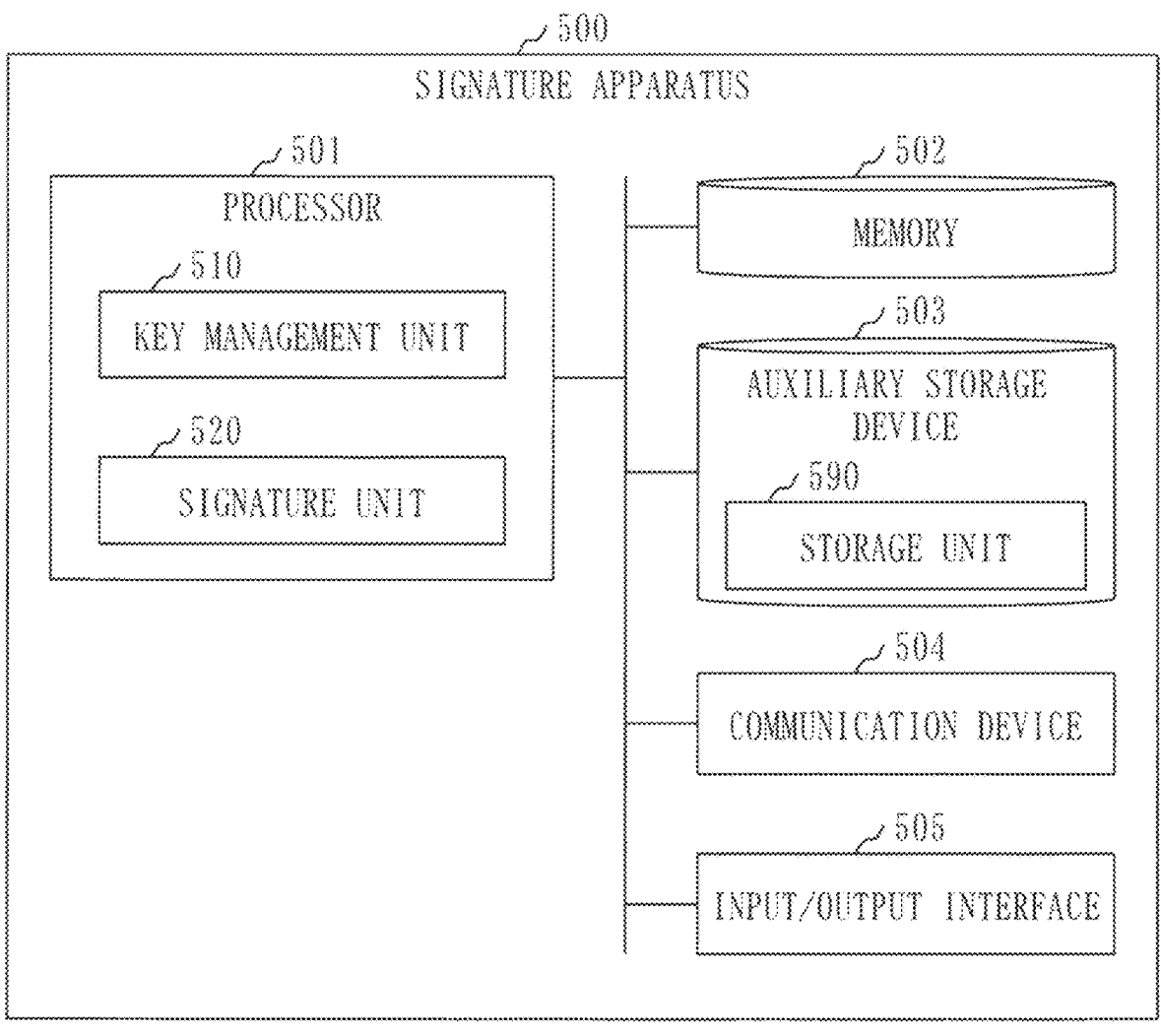
FIG. 11 shows a configuration of a signature apparatus 500 in Embodiment 2.

With reference to FIG. 11, a configuration of the signature apparatus 500 is described.

The signature apparatus 500 is a computer having pieces of hardware such as a processor 501, a memory 502, an auxiliary storage device 503, a communication device 504, and an input/output interface 505. These pieces of hardware are interconnected via signal lines.

The processor 501 is an IC to perform arithmetic processing and controls the other pieces of hardware. The processor 501 is a CPU, for example.

The memory 502 is a volatile or non-volatile storage device. The memory 502 is also called a main storage device or main memory. The memory 502 is a RAM, for example. Data stored in the memory 502 is saved in the auxiliary storage device 503 as needed.

The auxiliary storage device 503 is a non-volatile storage device. The auxiliary storage device 503 is a ROM, an HDD, flash memory, or a combination thereof, for example. Data stored in the auxiliary storage device 503 is loaded into the memory 502 as needed.

The communication device 504 is a receiver and a transmitter. The communication device 504 is a communication chip or a NIC, for example. Communications of the signature apparatus 500 are performed using the communication device 504.

The input/output interface 505 is ports to which input devices and output devices are connected. For example, the input/output interface 505 is USB terminals, the input device is a keyboard and a mouse, and the output device is a display. Input and output of the signature apparatus 500 are performed using the input/output interface 505.

The signature apparatus 500 includes elements such as a key management unit 510 and a signature unit 520. These elements are implemented in software.

The auxiliary storage device 503 has stored therein a signature program for causing a computer to function as the key management unit 510 and the signature unit 520. The signature program is loaded into the memory 502 and executed by the processor 501.

The auxiliary storage device 503 further stores an OS therein. At least part of the OS is loaded into the memory 502 and executed by the processor 501.

The processor 501 executes the signature program while running the OS.

Input and output data for the signature program is stored in a storage unit 590.

The auxiliary storage device 503 functions as the storage unit 590. However, a storage device such as the memory 502, a register in the processor 501, and cache memory in the processor 501 may function as the storage unit 590 in place of or in conjunction with the auxiliary storage device 503.

The signature apparatus 500 may also include multiple processors to replace the processor 501.

The signature program can be recorded (stored) on a non-volatile recording medium such as an optical disk or flash memory in a computer-readable manner.
\*\*\*Description of Operation\*\*\*
With reference to FIGS. 12 and 13, the data management method will be described.

At the signature apparatus 500, the key management unit 510 generates a pair of a secret key and a public key. The secret key is stored in the storage unit 590 of the signature apparatus 500. The public key is stored in the storage unit 390 of the data verification apparatus 300.

Figure 12:
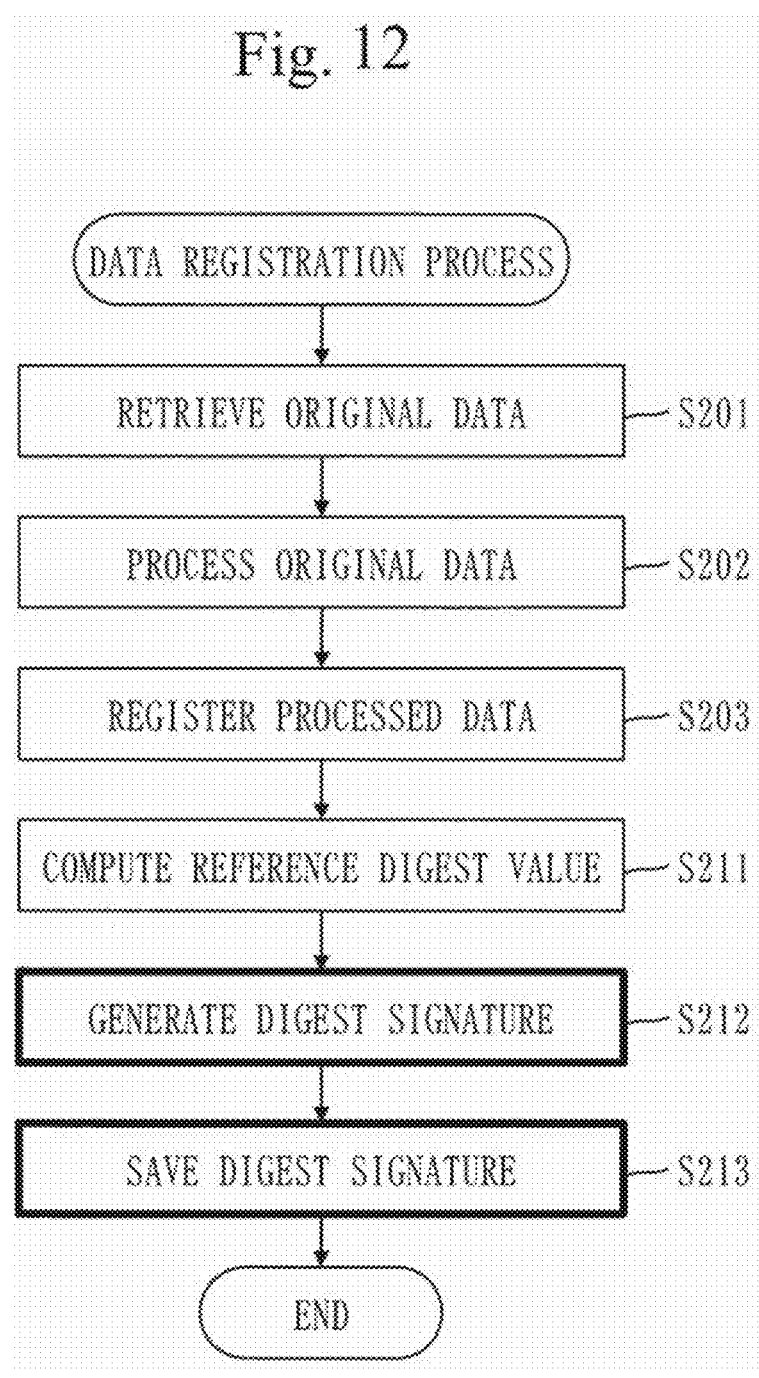
FIG. 12 is a flowchart of a data registration process in Embodiment 2.

With reference to FIG. 12, a data registration process is described.

Steps S201 to S203 are the same as steps S101 to S103 in Embodiment 1.

In step S211, the reference digest value computation unit 311 computes a reference digest value using the original data and the processed data.

Step S211 is the same as step S111 in Embodiment 1.

In step S212, the signature unit 520 generates a signature for the reference digest value (hereinafter, a digest signature).

A digest signature is a value obtained by encrypting the reference digest value with a secret key.

A digest signature is generated in the following manner.

The reference digest value computation unit 311 transmits the reference digest value to the signature apparatus 500. The reference digest value computation unit 311 also temporarily records the reference digest value.

The signature unit 520 receives the reference digest value and generates a digest signature for the reference digest value with the secret key.

The signature unit 520 transmits the digest signature to the data verification apparatus 300.

The reference digest value computation unit 311 receives the digest signature.

In step S213, the data verification unit 320 saves the digest signature in the data store 391.

The digest signature is saved in the following procedure.

The data verification unit 320 decrypts the digest signature with the public key to obtain the reference digest value.

The data verification unit 320 compares the temporarily recorded reference digest value with the reference digest value resulting from the decryption.

If the comparison shows that the temporarily recorded reference digest value and the reference digest value resulting from the decryption are the same, the data verification unit 320 saves the digest signature in the data store 391.

If the comparison shows that the temporarily recorded reference digest value and the reference digest value resulting from the decryption are different, processing proceeds to step S212.

Figure 13:
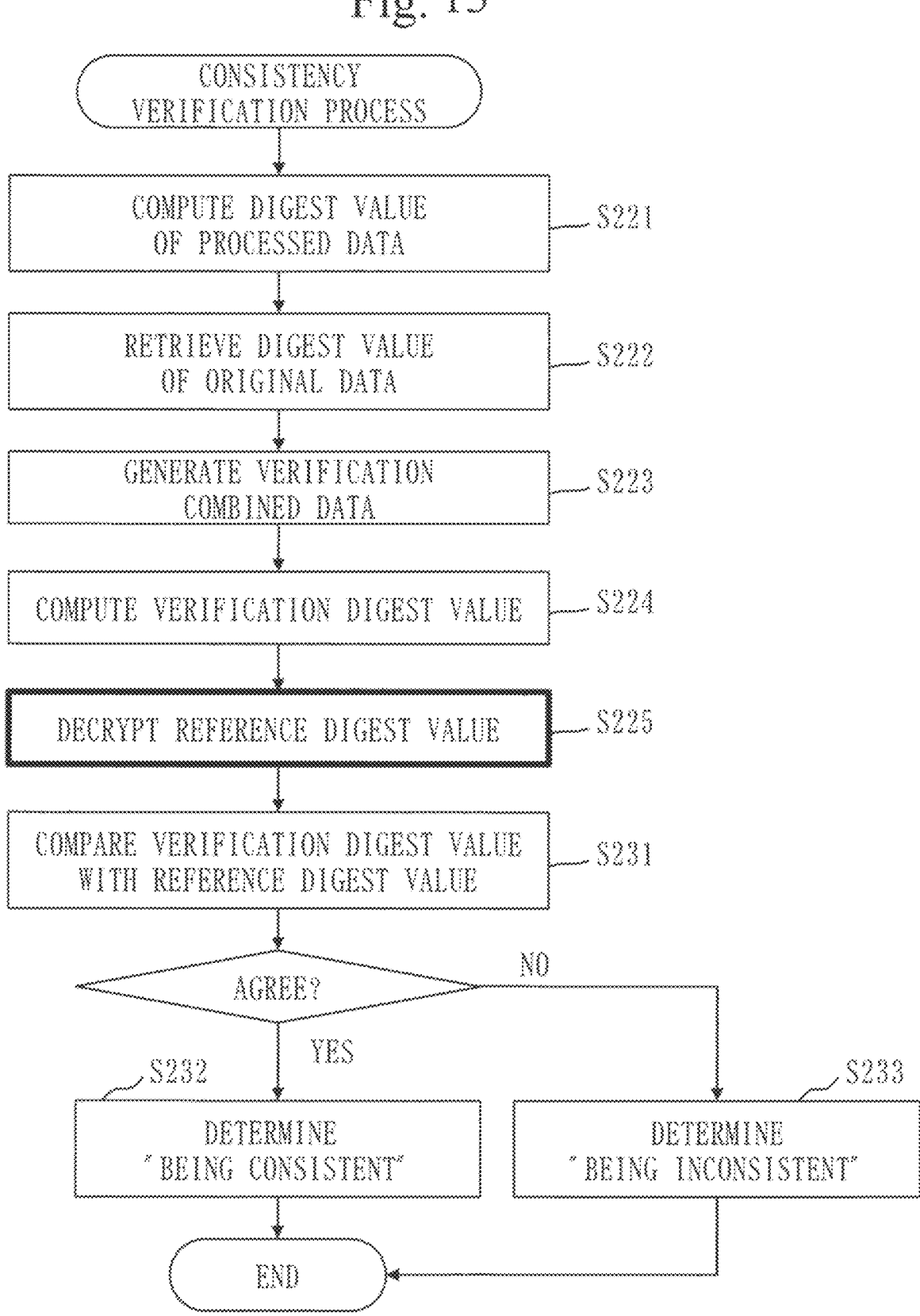
FIG. 13 is a flowchart of a consistency verification process in Embodiment 2.

With reference to FIG. 13, a consistency verification process is described.

Steps S221 to S224 are the same as steps S121 to S124 in Embodiment 1.

In step S225, the data verification unit 320 retrieves the digest signature from the data store 391 and decrypts the reference digest value from the digest signature using the public key.

Steps S231 to S233 are the same as steps S131 to S133 in Embodiment 1.

Effects of Embodiment 2

Figure 14:
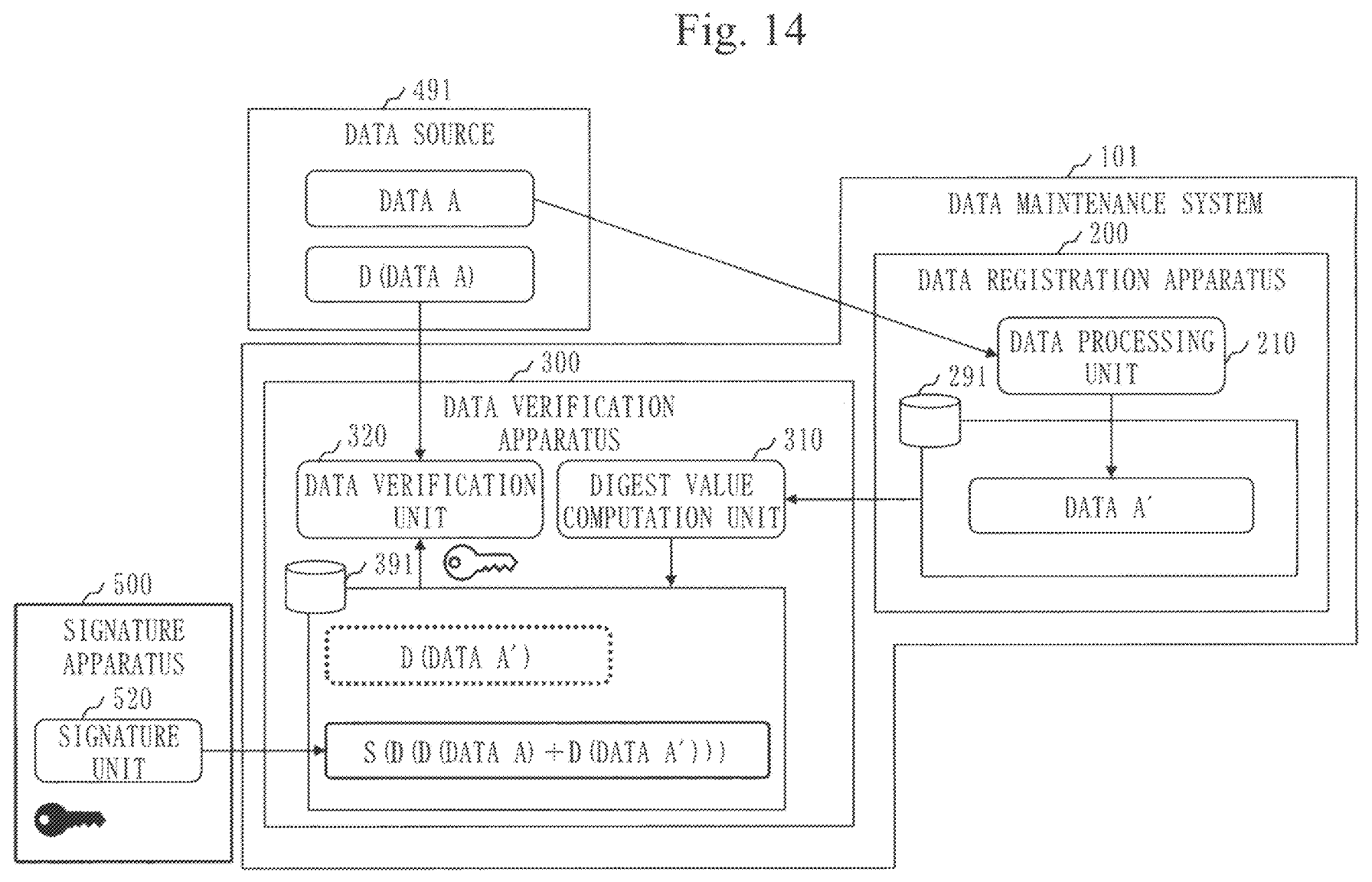

With reference to FIG. 14, effects of Embodiment 2 are described.

It is desirable that the reference digest value DD is securely managed since tampering of the reference digest value DD makes detection of tampering of data A' impossible.

Thus, the signature apparatus 500 is provided and a digest signature S(D(D(data A)+D (data A'))) (hereinafter called SDD) is generated using a secret key. The reference digest value DD can be acquired by decrypting the digest signature SDD with the public key. It is difficult to conveniently tamper with the digest signature SDD unless the secret key is acquired.

Embodiment 2 accordingly can securely manage the reference digest value DD.

Embodiment 3

An arrangement for managing a reference digest value in the data source 491 will be described with reference to FIGS. 15 to 17 primarily in terms of differences from Embodiment 1.

*Description of Configuration*

The configuration of the data management system 100 is the same as the configuration in Embodiment 1.

*Description of Operation*

Figure 15:
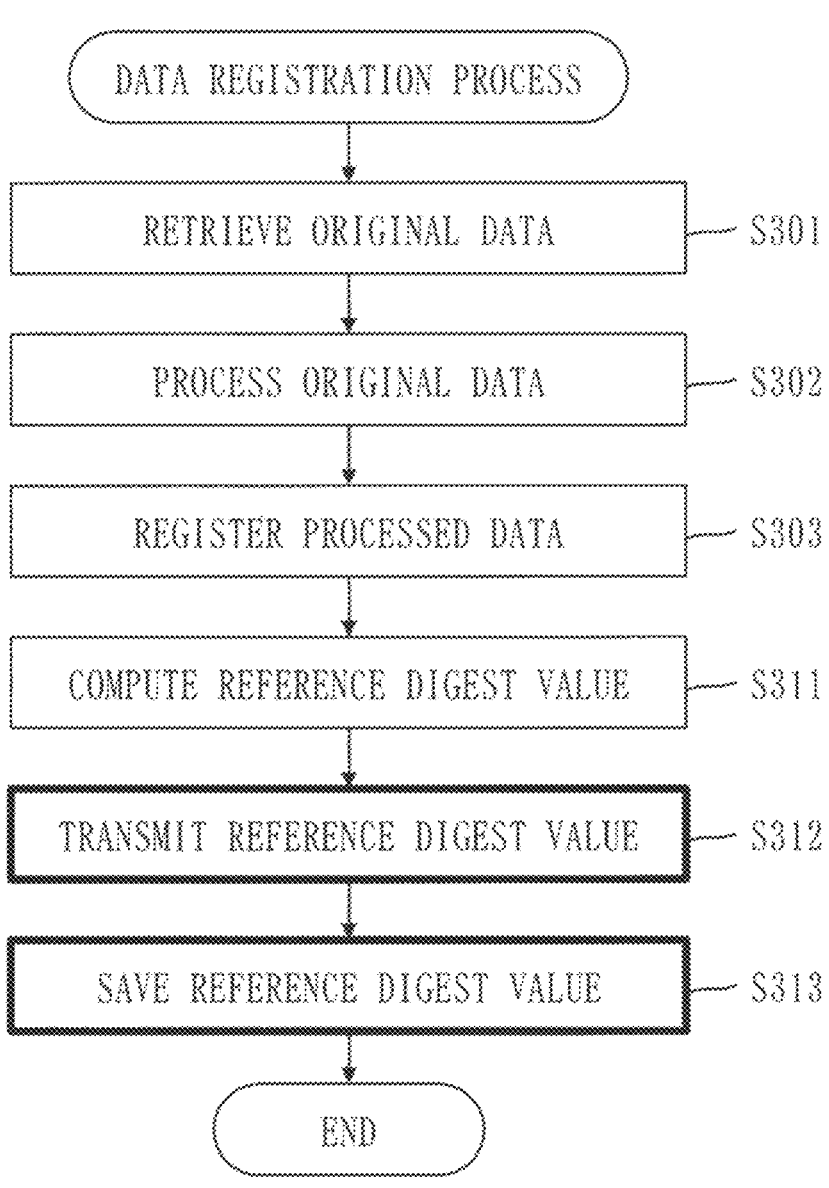
FIG. 15 is a flowchart of a data registration process in Embodiment 3.

With reference to FIG. 15, a data registration process is described.

Steps S301 to S303 are the same as steps S101 to S103 in Embodiment 1.

Step S311 is the same as step S111 in Embodiment 1.

In step S312, the reference digest value computation unit 311 transmits the reference digest value to the data source apparatus 400.

The data management unit 410 receives the reference digest value.

In step S313, the data management unit 410 saves the reference digest value in the data source 491.

Figure 16:
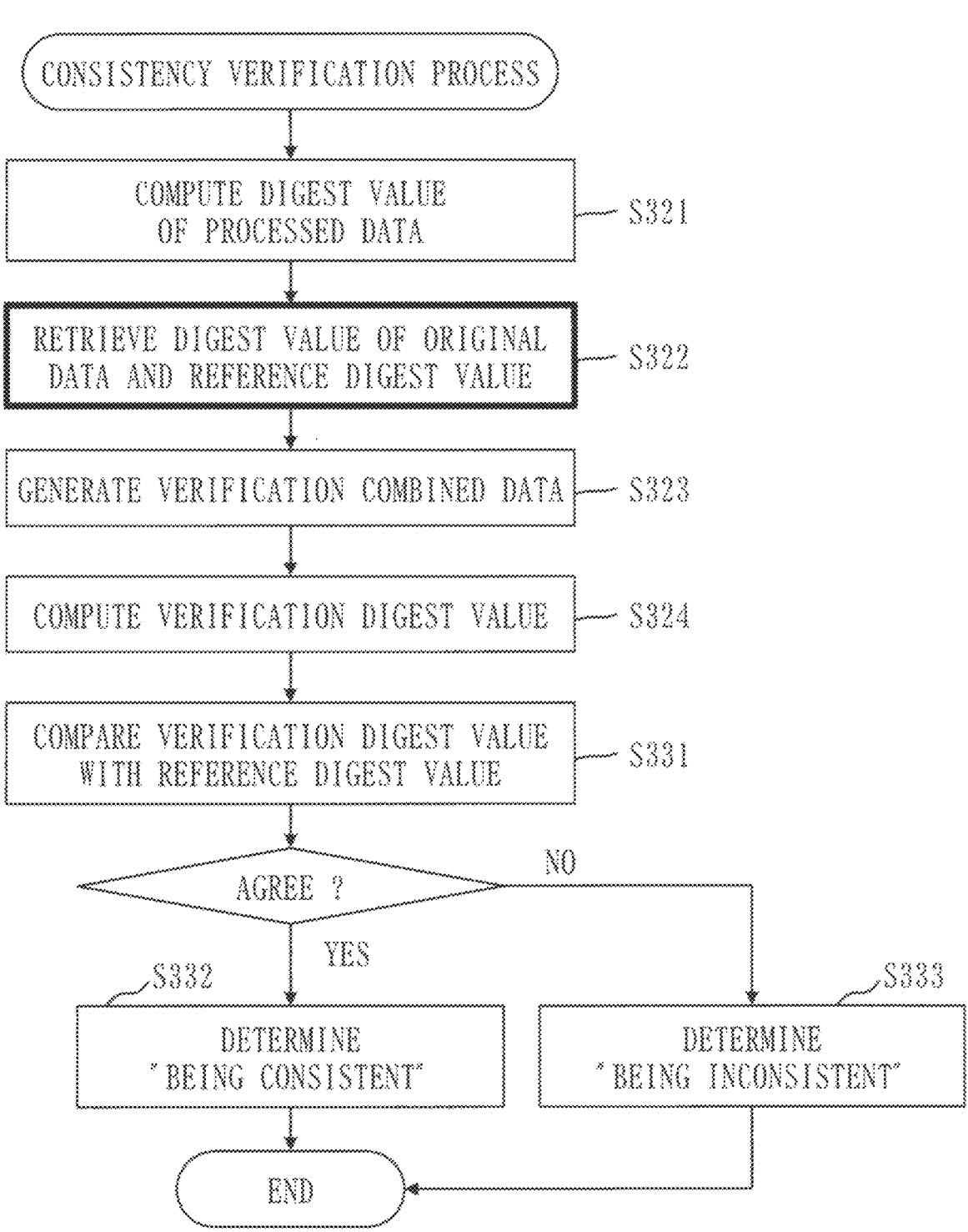
FIG. 16 is a flowchart of a consistency verification process in Embodiment 3.

With reference to FIG. 16, a consistency verification process is described.

In step S321, the provisional digest value computation unit 312 computes a digest value of the processed data. The computed digest value is referred to as a provisional digest value.

Step S321 is the same as step S121 in Embodiment 1.

In step S322, the data verification unit 320 retrieves the digest value of the original data, which is the digest value saved in the data source 491. The retrieved digest value is referred to as a provisional digest value.

The data verification unit 320 also retrieves the reference digest value saved in the data source 491.

For example, the data verification unit 320 transmits a digest value request to the data source apparatus 400. The data management unit 410 receives the digest value request, reads the digest value of the original data and the reference digest value from the data source 491, and transmits the digest value of the original data and the reference digest value to the data verification apparatus 300. The data verification unit 320 then receives the digest value of the original data and the reference digest value.

In step S323, the data verification unit 320 generates verification combined data.

Step S323 is the same as step S123 in Embodiment 1.

In step S324, the data verification unit 320 computes a verification digest value.

Step S324 is the same as step S124 in Embodiment 1.

Steps S331 to S333 are the same as steps S131 to S133 in Embodiment 1.

Effects of Embodiment 3

Figure 17:
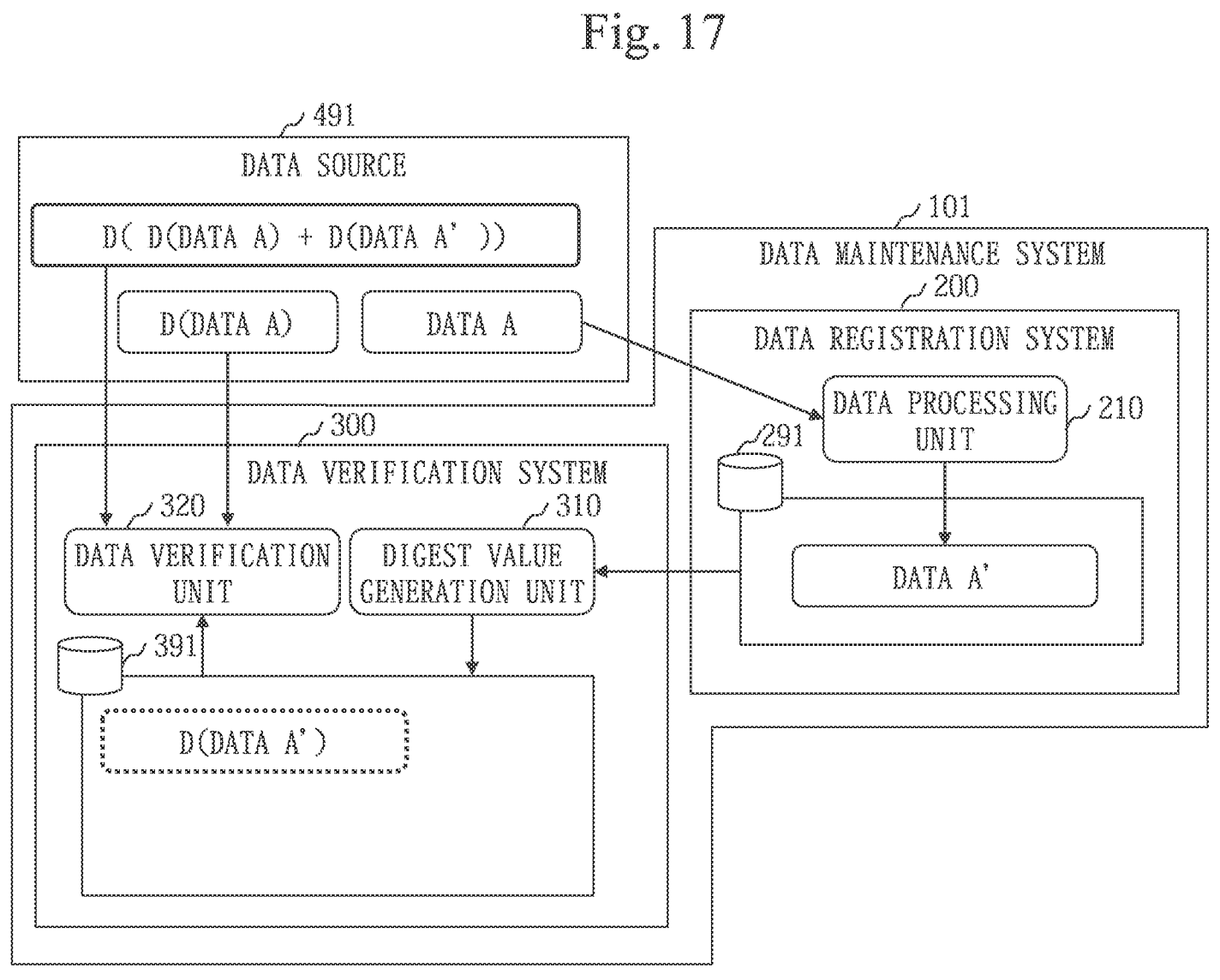

With reference to FIG. 17, effects of Embodiment 3 are described.

It is desirable that the reference digest value DD is securely managed since tampering of the reference digest value DD makes detection of tampering of data A' impossible.

Thus, the reference digest value DD is managed in the data source 491 such that tampering of reference digest value DD is difficult. It is desirable that the data source 491 is a system that is difficult to tamper with, like a block chain.

Embodiment 3 thereby can securely manage the reference digest value DD.

Embodiment 4

An arrangement for enhancing verification accuracy will be described with reference to FIGS. 18 to 20 primarily in terms of differences from Embodiment 1.

*Description of Configuration*

The configuration of the data management system 100 is the same as the configuration in Embodiment 1.

*Description of Operation*

Figure 18:
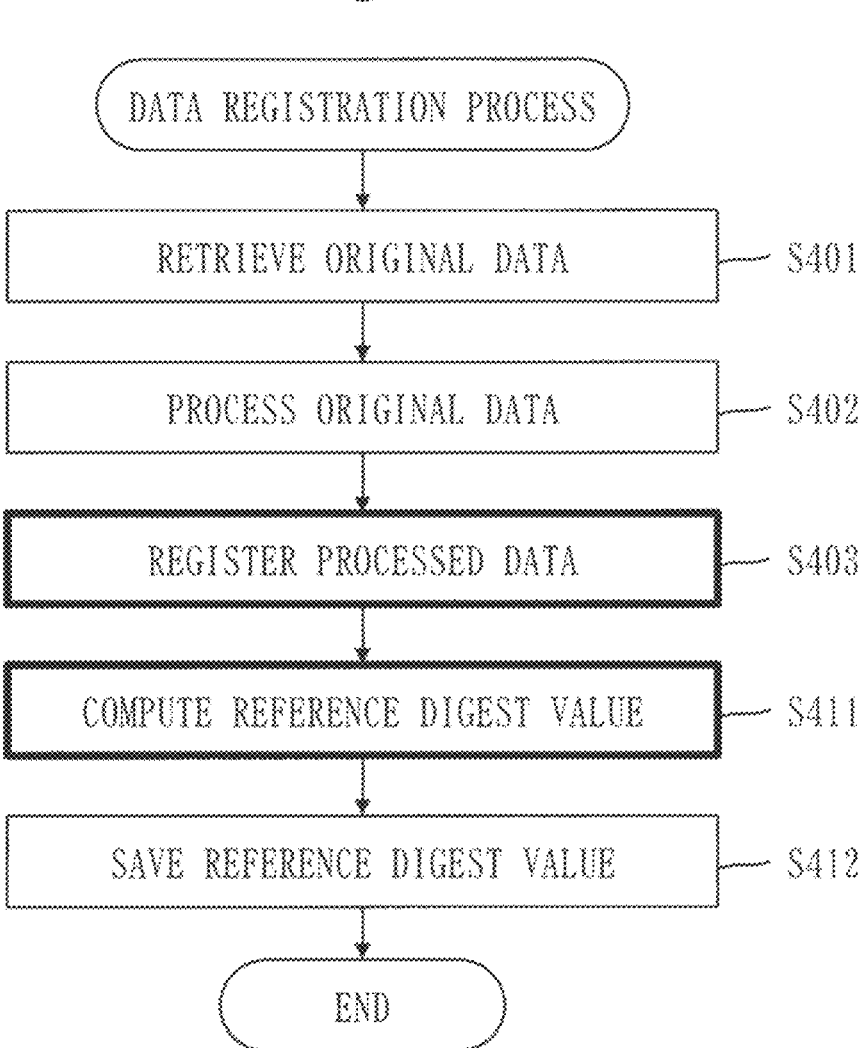
FIG. 18 is a flowchart of a data registration process in Embodiment 4.

With reference to FIG. 18, a data registration process is described.

In step S401, the data processing unit 210 retrieves the original data saved in the data source 491.

Step S401 is the same as step S101 in Embodiment 1.

In step S402, the data processing unit 210 executes a data processing program on the original data as input. This provides processed data.

Step S402 is the same as step S102 in Embodiment 1.

In step S403, the data processing unit 210 registers the data processing program in the data store 291 with the processed data.

In step S411, the reference digest value computation unit 311 retrieves the data processing program with the original data and the processed data.

The reference digest value computation unit 311 then computes a reference digest value using the original data, the processed data, and the data processing program.

Specifically, the reference digest value computation unit 311 computes the respective digest values of the original data, the processed data, and the data processing program, and combines the computed digest values to generate reference combined data. The reference digest value computation unit 311 then computes a digest value of the reference combined data (a reference digest value).

In step S412, the reference digest value computation unit 311 saves the reference digest value in the data store 391.

Step S412 is the same as step S112 in Embodiment 1.

Figure 19:
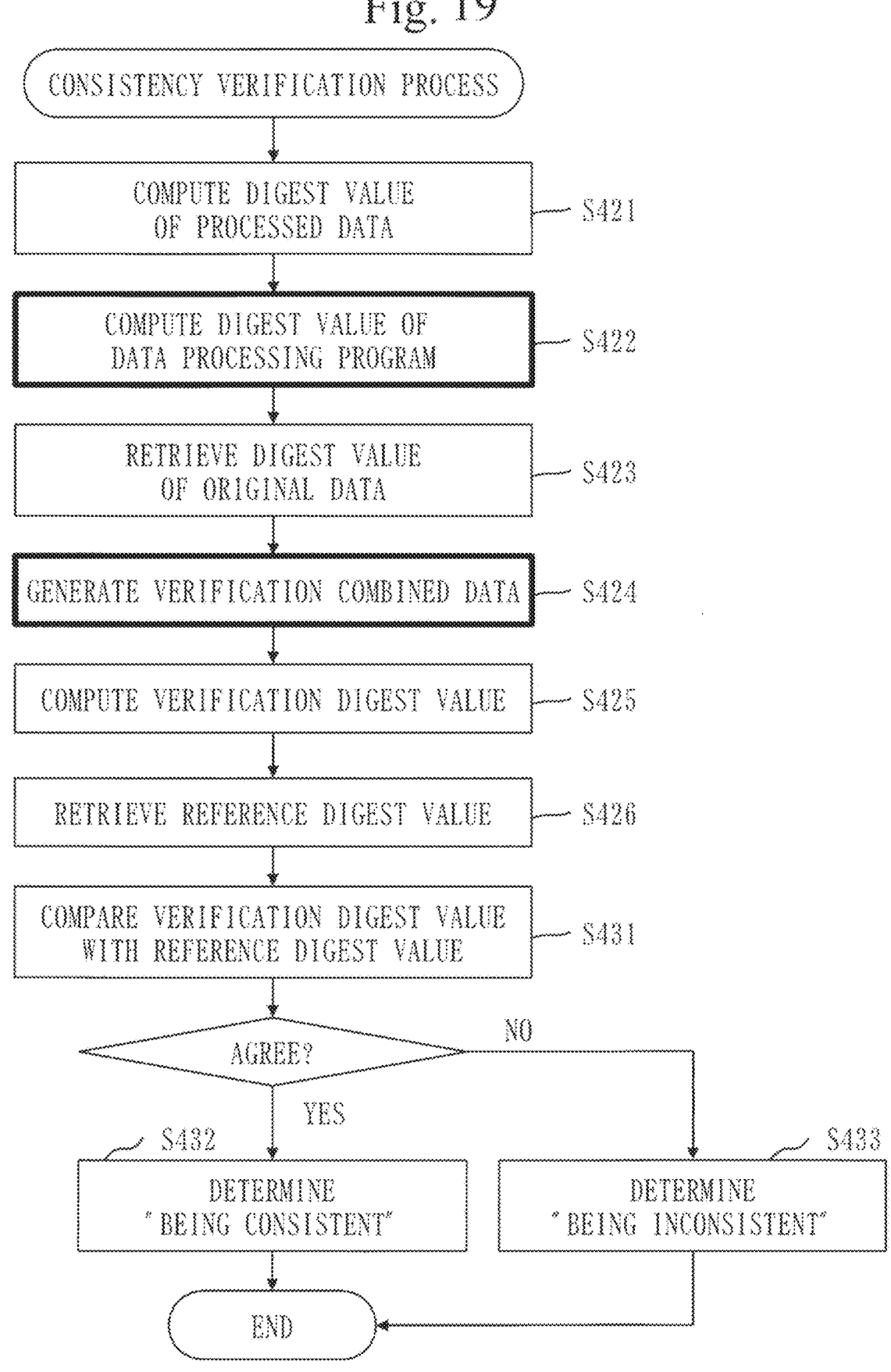
FIG. 19 is a flowchart of a consistency verification process in Embodiment 4.

With reference to FIG. 19, a consistency verification process is described.

In step S421, the provisional digest value computation unit 312 computes a digest value of the processed data. The computed digest value is referred to as a provisional digest value.

Step S421 is the same as step S121 in Embodiment 1.

In step S422, the provisional digest value computation unit 312 retrieves the data processing program registered in the data store 291.

The provisional digest value computation unit 312 then computes a digest value of the data processing program. The computed digest value is referred to as a provisional digest value.

In step S423, the data verification unit 320 retrieves the digest value of the original data, which is the digest value saved in the data source 491. The retrieved digest value is referred to as a provisional digest value.

Step S423 is the same as step S122 in Embodiment 1.

In step S424, the data verification unit 320 combines the provisional digest value of the original data, the provisional digest value of the processed data, and the provisional digest value of the data processing program to generate combined data. The generated combined data is referred to as verification combined data.

In step S425, the data verification unit 320 computes a digest value of the verification combined data. The computed digest value is referred to as a verification digest value.

Step S425 is the same as step S124 in Embodiment 1.

In step S426, the data verification unit 320 retrieves the reference digest value saved in the data store 391.

Step S426 is the same as step S125 in Embodiment 1.

Steps S431 to S433 are the same as steps S131 to S133 in Embodiment 1.

Effects of Embodiment 4

Figure 20:
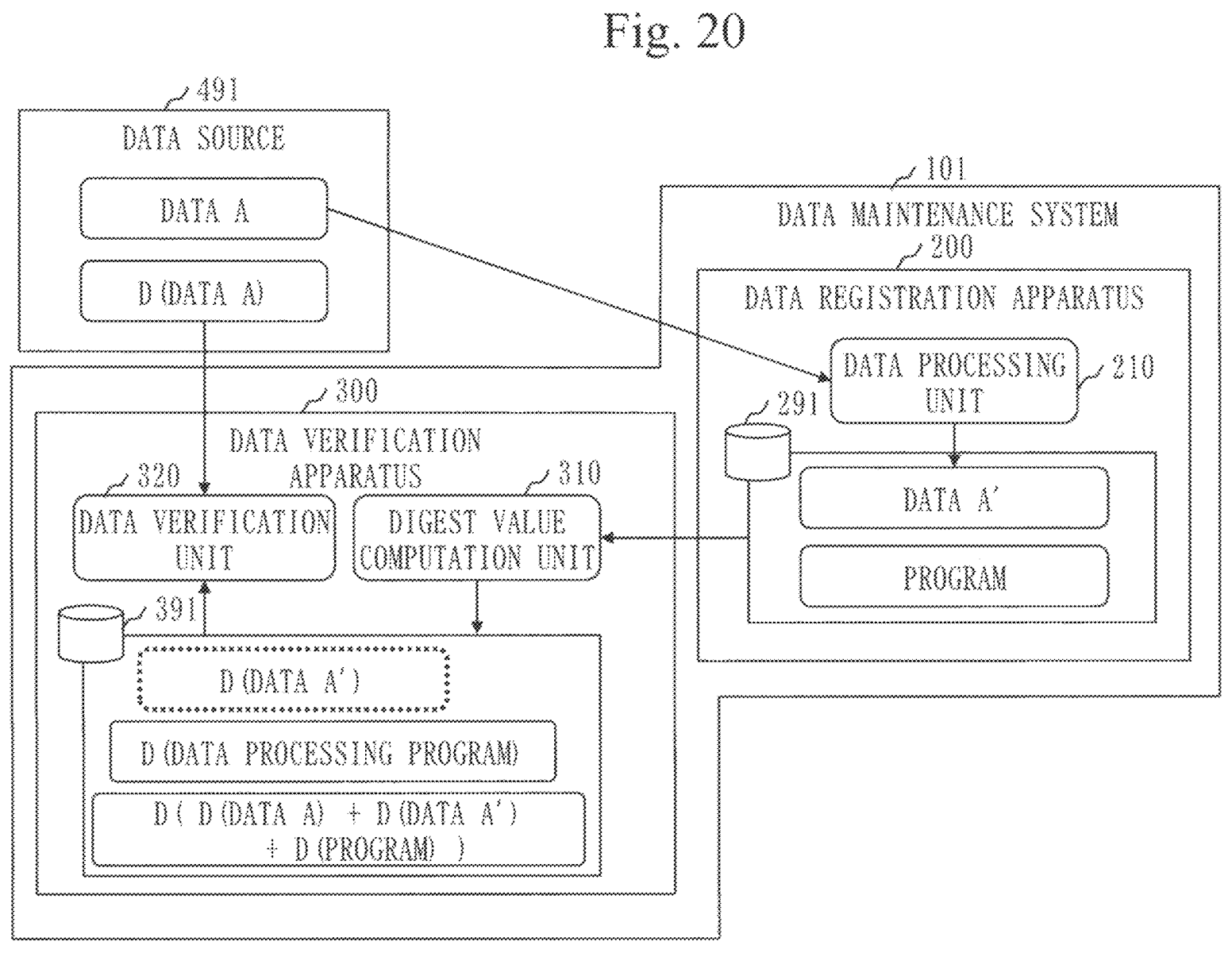

With reference to FIG. 20, effects of Embodiment 4 are described.

The data processing program is registered with data A'. Then, the digest value D of data A, the digest value D of data A', and the digest value D of the data processing program are combined, and the digest value of the combined data is saved as reference digest value D(D(data A)+D(data A')+D (data processing program)) (hereinafter called DD).

By also saving the data processing program together as an associated reference digest value, it can be guaranteed that data A' was generated by converting data A with the data processing program, providing a stronger guarantee that data A' was derived from data A. To tamper with data A' in a consistent manner, it is necessary to tamper not only with the digest value D of data A' and the reference digest value DD but also with the data processing program. Accordingly, higher robustness is achieved.

Embodiment 5

An arrangement for enhancing verification accuracy through management of multiple data processing programs will be described with reference to FIGS. 21 to 23 primarily in terms of differences from Embodiment 1.

*Description of Configuration*

The configuration of the data management system 100 is the same as the configuration in Embodiment 1.

However, multiple data processing programs are stored in the storage unit 290 of the data registration apparatus 200.

*Description of Operation*

Figure 21:
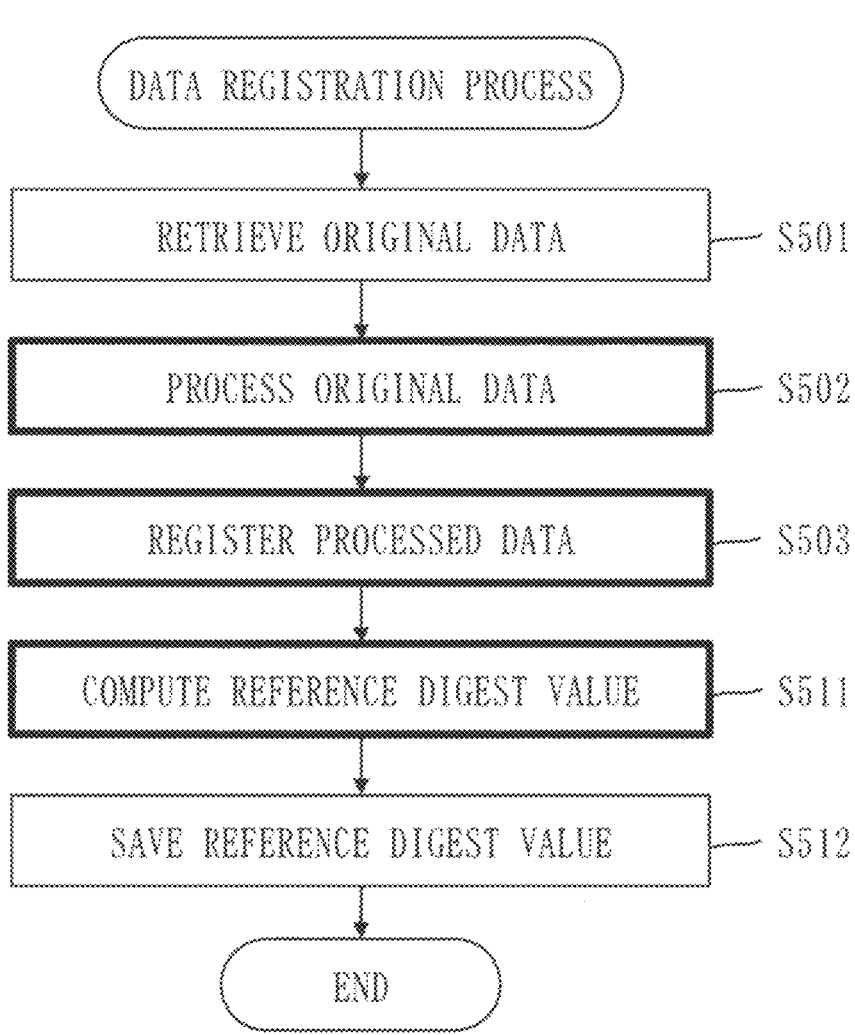
FIG. 21 is a flowchart of a data registration process in Embodiment 5.

With reference to FIG. 21, a data registration process is described.

In step S501, the data processing unit 210 retrieves the original data saved in the data source 491.

Step S501 is the same as step S101 in Embodiment 1.

In step S502, the data processing unit 210 selects a data processing program for processing the original data from the multiple data processing programs.

For example, the data processing program is designated by the user of the data registration apparatus 200. Alternatively, the data processing program is determined by the type of the original data.

The data processing unit 210 then executes the selected data processing program on the original data as input. This provides processed data.

In step S503, the data processing unit 210 registers a program identifier of the data processing program that was used in the data store 291 together with the processed data.

In step S511, the reference digest value computation unit 311 retrieves the data processing program that was used, together with the original data and the processed data.

The reference digest value computation unit 311 then computes a reference digest value with the original data, the processed data, and the data processing program.

Specifically, the reference digest value computation unit 311 computes the respective digest values of the original data, the processed data, and the data processing program, and combines the computed digest values to generate reference combined data. The reference digest value computation unit 311 then computes a digest value of the reference combined data (a reference digest value).

In step S512, the reference digest value computation unit 311 saves the reference digest value in the data store 391.

Step S512 is the same as step S112 in Embodiment 1.

Figure 22:
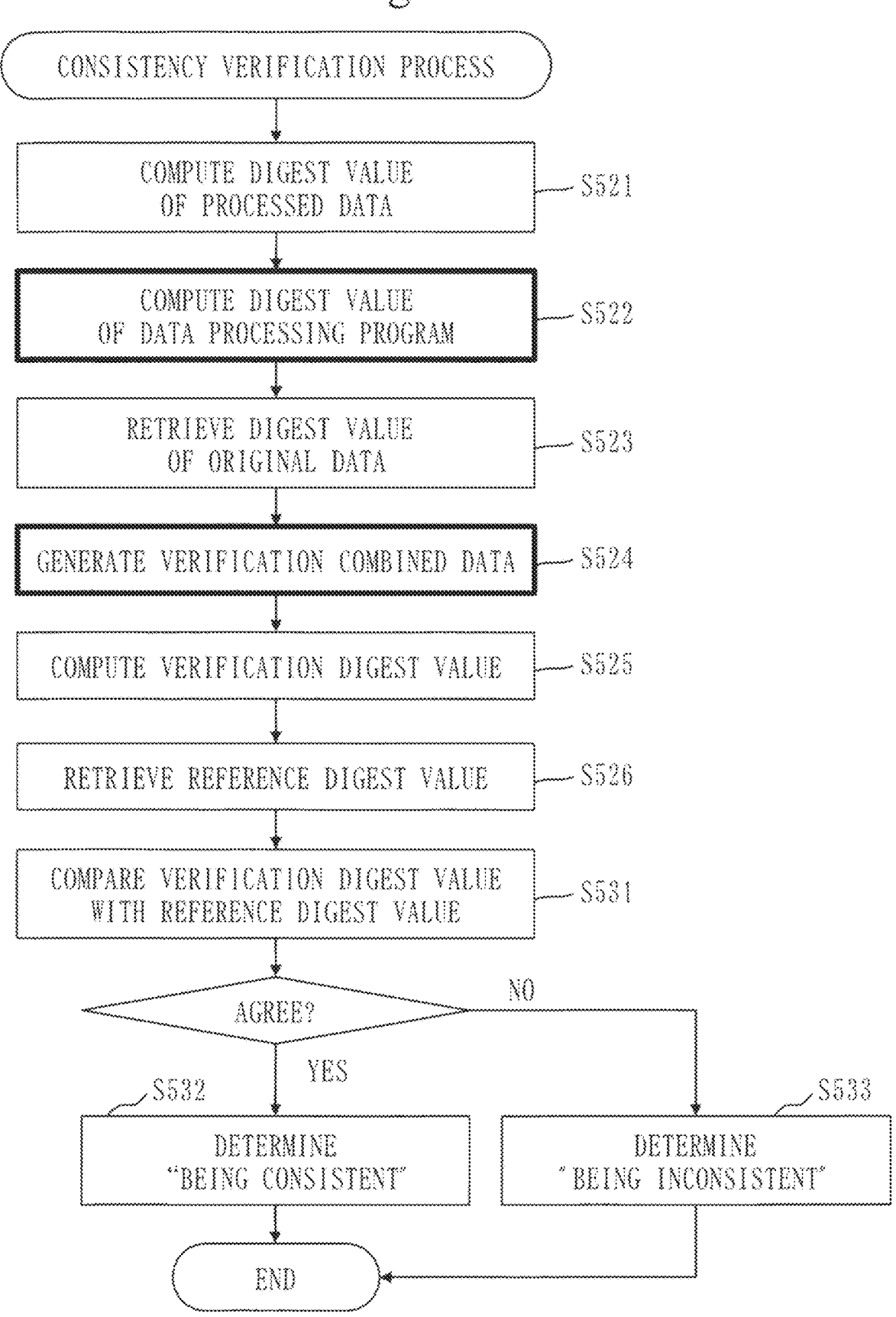
FIG. 22 is a flowchart of a consistency verification process in Embodiment 5.

With reference to FIG. 22, a consistency verification process is described.

In step S521, the provisional digest value computation unit 312 computes a digest value of the processed data. The computed digest value is referred to as a provisional digest value.

Step S521 is the same as step S121 in Embodiment 1.

In step S522, the provisional digest value computation unit 312 retrieves the program identifier registered in the data store 291.

The provisional digest value computation unit 312 further retrieves the data processing program identified by the retrieved program identifier.

The provisional digest value computation unit 312 then computes a digest value of the data processing program. The computed digest value is referred to as a provisional digest value.

In step S523, the data verification unit 320 retrieves the digest value of the original data, which is the digest value saved in the data source 491. The retrieved digest value is referred to as a provisional digest value.

Step S523 is the same as step S122 in Embodiment 1.

In step S524, the data verification unit 320 combines the provisional digest value of the original data, the provisional digest value of the processed data, and the provisional digest value of the data processing program to generate combined data. The generated combined data is referred to as verification combined data.

In step S525, the data verification unit 320 computes a digest value of the verification combined data. The computed digest value is referred to as a verification digest value.

Step S525 is the same as step S124 in Embodiment 1.

In step S526, the data verification unit 320 retrieves the reference digest value saved in the data store 391.

Step S526 is the same as step S125 in Embodiment 1.

Steps S531 to S533 are the same as steps S131 to S133 in Embodiment 1.

Effects of Embodiment 5

Figure 23:
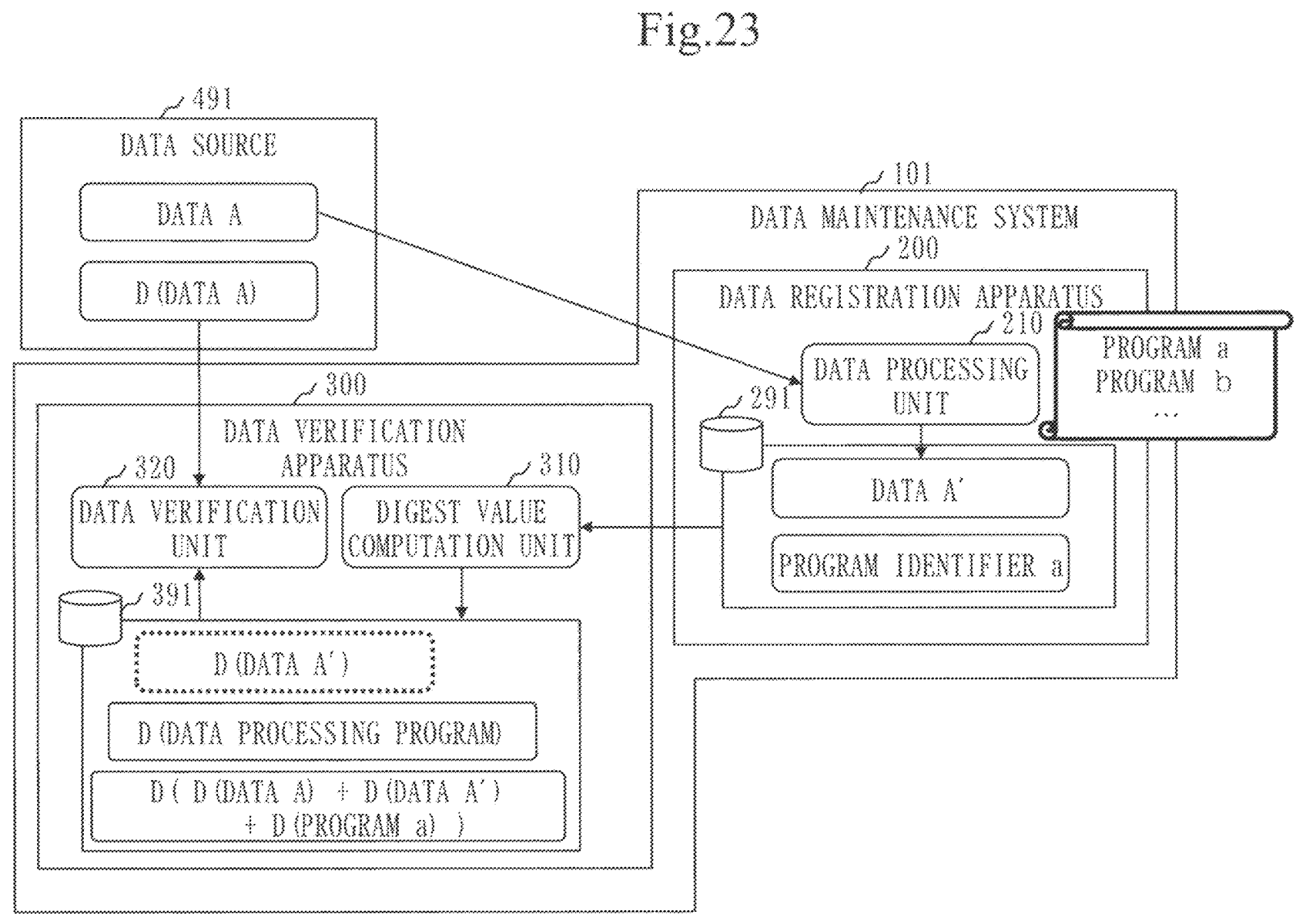

With reference to FIG. 23, effects of Embodiment 5 are described.

The program identifier of the data processing program is registered with data A'. Then, the digest value D of data A, the digest value D of data A', and the digest value D of the data processing program are combined, and a digest value of the combined data is saved as the reference digest value DD. During verification, the digest value D of the data processing program identified by the program identifier is computed.

It can thus be verified that the data A' was derived from data A with strong guarantee. For example, it is possible to detect tampering of data A' by an unauthorized data processing program.

Additionally, space saving in the data store 291 can be achieved by registering the program identifier in the data store 291 in place of the data processing program.

Furthermore, by limiting the data processing program, execution of arbitrary data processing programs is prohibited and fraud is less likely to be introduced into the generation process of data A'.

Embodiment 6

An arrangement in the case of data in the data source 491 being updated will be described with reference to FIGS. 24 to 28 primarily in terms of differences from Embodiment 1.
*Description of Configuration*
The configuration of the data management system 100 is the same as the configuration in Embodiment 1.

However, the original data saved in the data source 491 is updated. The original data before update is referred to as old data.

In the data source 491, at least the original data and the digest value of the original data are saved.
*Description of Operation*
With reference to FIGS. 24 to 26, the data management method will be described.

Before the old data is updated, the data processing unit 210 retrieved the old data saved in the data source 491, processed the retrieved old data to obtain processed old data, and registered the processed old data in the data store 291.

Figure 24:
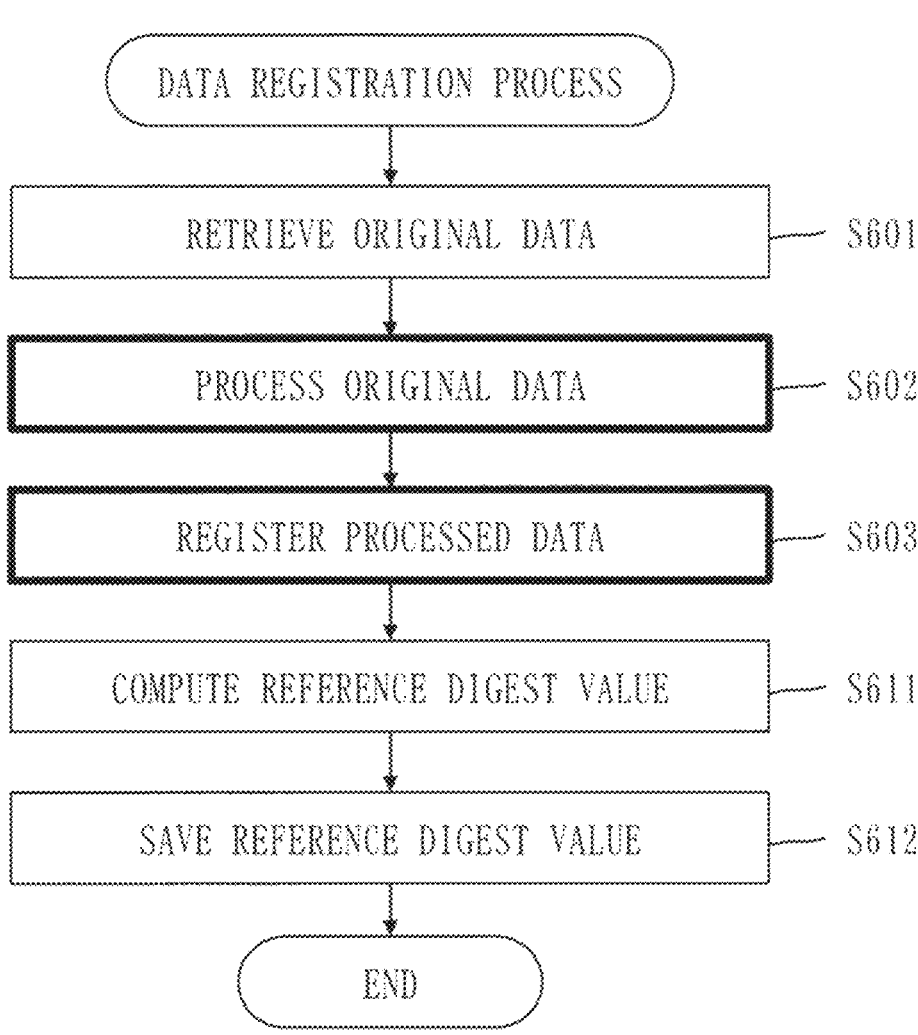
FIG. 24 is a flowchart of a data registration process in Embodiment 6.

With reference to FIG. 24, a data registration process is described.

In step S601, the data processing unit 210 retrieves the original data saved in the data source 491.

Step S601 is the same as step S101 in Embodiment 1.

In step S602, the data processing unit 210 processes the retrieved original data. Specifically, the data processing unit 210 executes a data processing program on the original data as input.

This provides processed original data. The processed original data is the original data after processing.

In step S603, the data processing unit 210 registers processed data in the data store 291.

The processed data is a set of the processed original data and the digest value of the processed old data.

The digest value of the processed old data is computed by the digest value computation unit 310, for example.

Steps S611 and S612 are the same as steps S111 and S112 in Embodiment 1.

Figure 25:
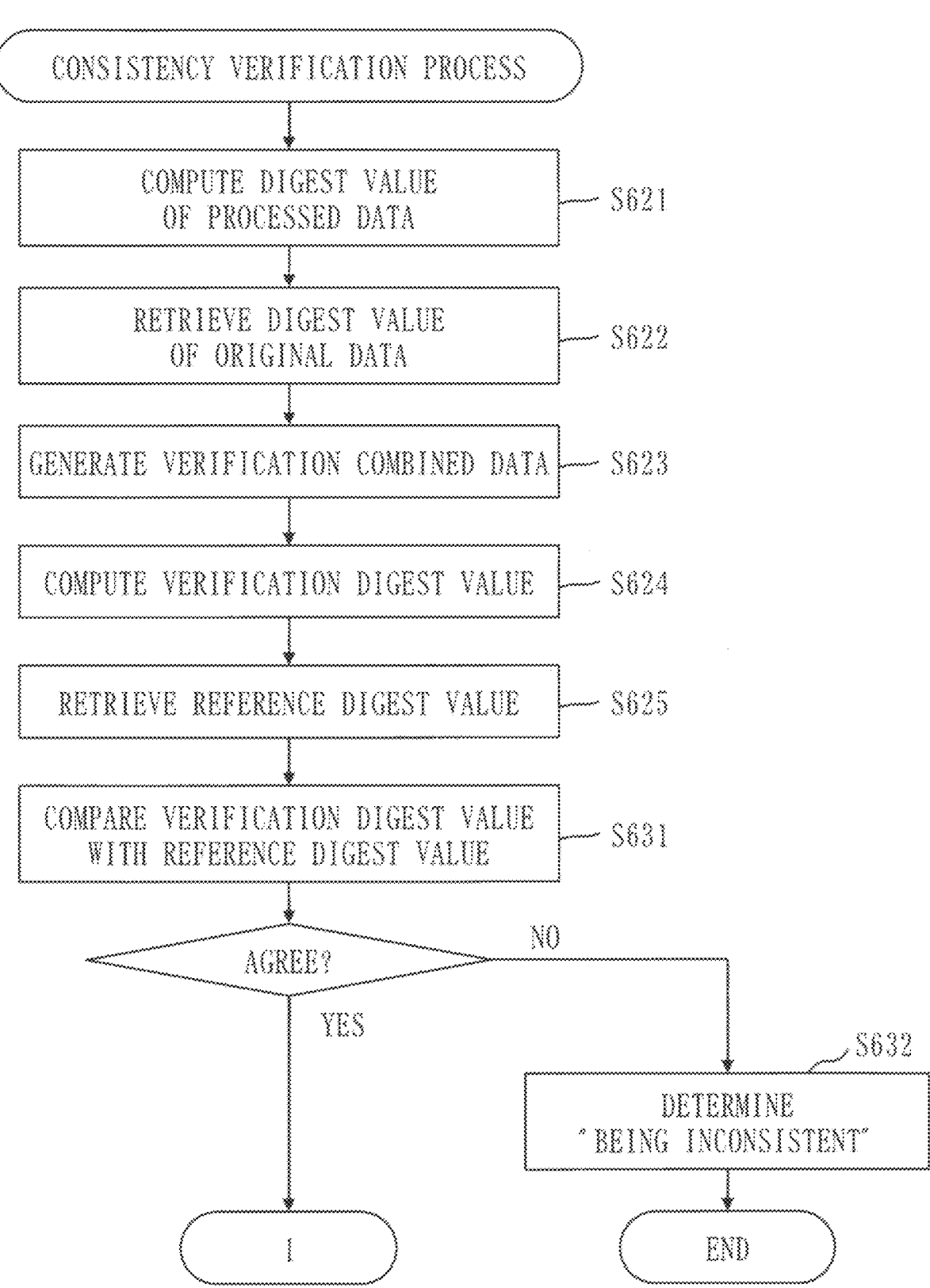
FIG. 25 is a flowchart of a consistency verification process in Embodiment 6.

With reference to FIGS. 25 and 26, a consistency verification process is described.

Steps S621 to S625 are the same as steps S121 to S125 in Embodiment 1.

In step S631, the data verification unit 320 compares the verification digest value with the reference digest value.

If the verification digest value agrees with the reference digest value, processing proceeds to step S641.

If the verification digest value does not agree with the reference digest value, processing proceeds to step S632.

In step S632, the data verification unit 320 determines "being inconsistent".

Step S632 is the same as step S133 in Embodiment 1.

In step S641, the data verification unit 320 retrieves the processed old data registered in the data store 291.

The data verification unit 320 then computes a digest value of the processed old data.

In step S642, the data verification unit 320 compares the digest value of the processed old data with the digest value in the registered processed data.

If the digest values agree with each other, the data verification unit 320 determines whether there is a digest value in the processed old data.

If there is a digest value in the processed old data, the processed old data becomes the processed data and processing proceeds to step S641.

If there is no digest value in the processed old data, processing proceeds to step S651.

If the digest values do not agree with each other, processing proceeds to step S652.

In step S651, the data verification unit 320 determines "being consistent".

The data verification unit 320 then outputs a determination result indicating "being consistent". For example, the data verification unit 320 shows the determination result on a display.

In step S652, the data verification unit 320 determines "being inconsistent".

The data verification unit 320 then outputs a determination result indicating "being inconsistent". For example, the data verification unit 320 shows the determination result on a display.

Effects of Embodiment 6

Figure 27:
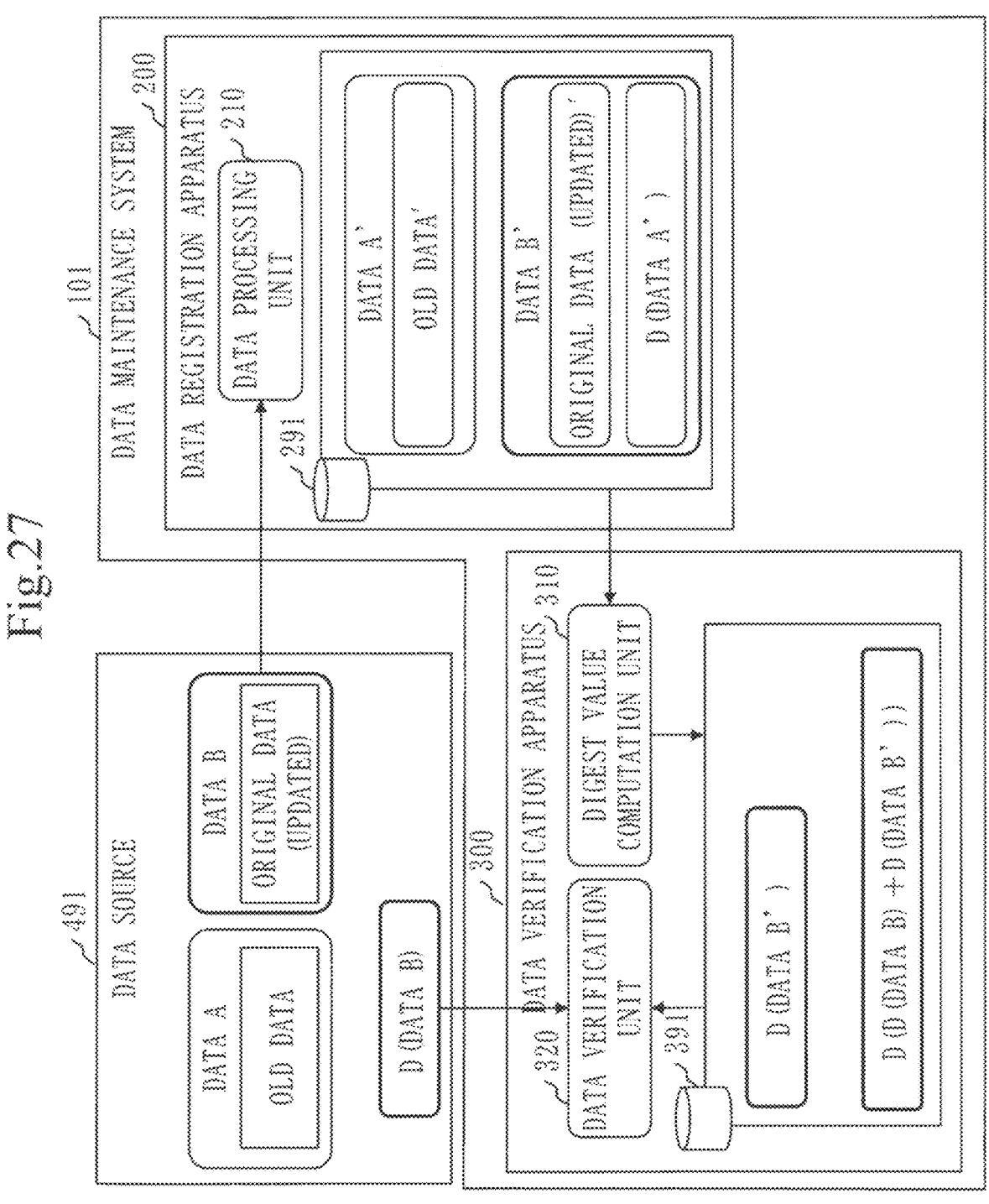
FIG. 27 schematically illustrates a data maintenance method in Embodiment 6.
Figure 28:
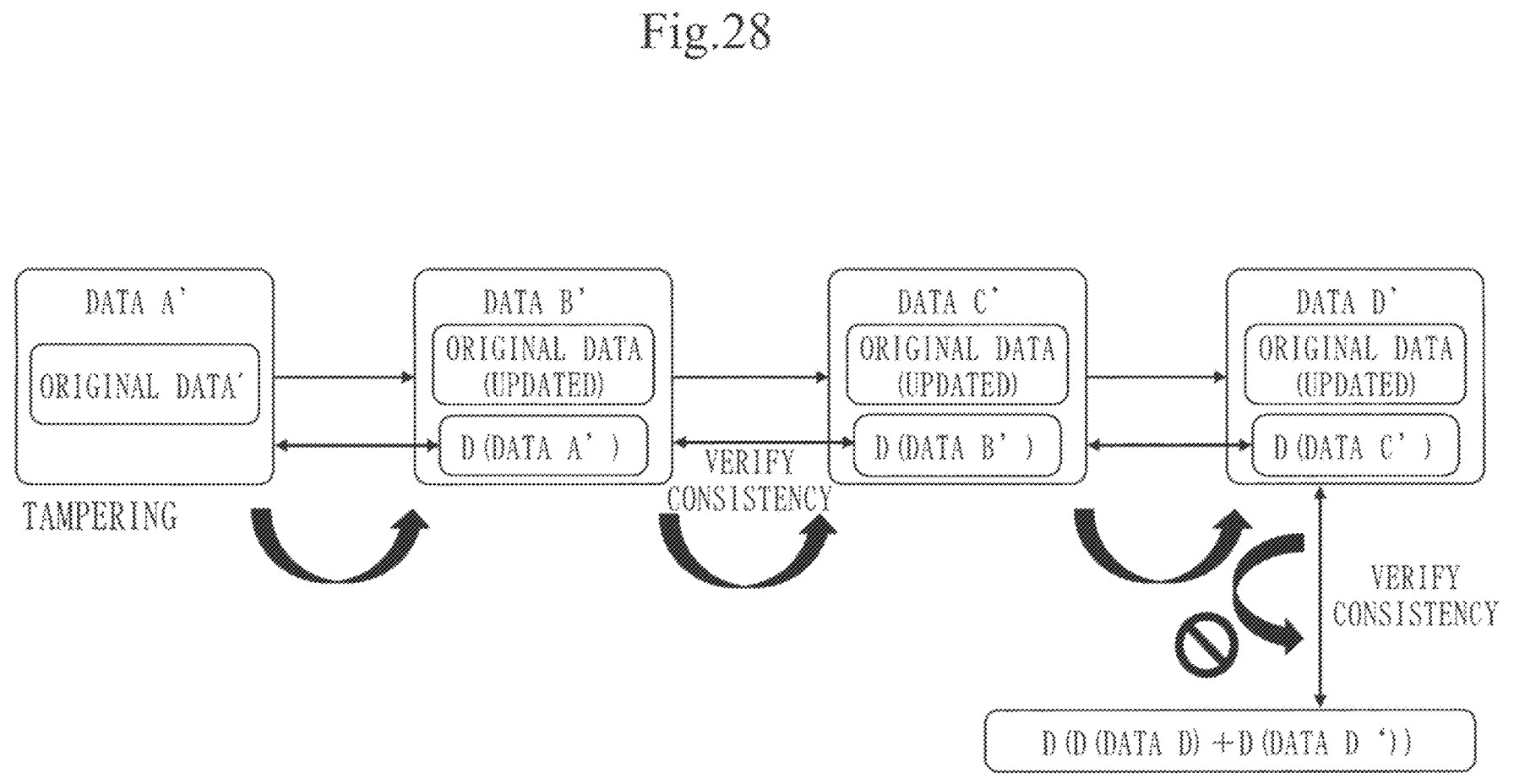

With reference to FIGS. 27 and 28, effects of Embodiment 6 are described.

In FIG. 27, the data in the data source 491 is updated and its update history is managed. In order to respond to the update of data and management of the update history, the data maintenance system 101 includes the digest value D of processed old data A' into processed data B', and saves the digest value D(D(data B)+D(data B')) of the processed data B' (hereinafter called DD).

The data maintenance system 101 can detect tampering of data history by performing verification while tracing the digest values D starting with the digest value DD. Only one digest value DD has to be saved.

FIG. 28 explains how tampering can be detected with only one digest value DD saved. For example, if data A' was tampered with, D(data A') for data B' needs to be tampered with in order to maintain consistency. Likewise, consistency can be maintained only by tampering with D(data B') for data C' and D(data C') for data D' and finally the digest value DD. Accordingly, as long as the digest value DD is robustly saved, tampering of any data could be detected.

Additional Description of Embodiments

The data maintenance system 101 may consist of a single device. That is, the data maintenance system 101 may be a data maintenance device.

Figure 29:
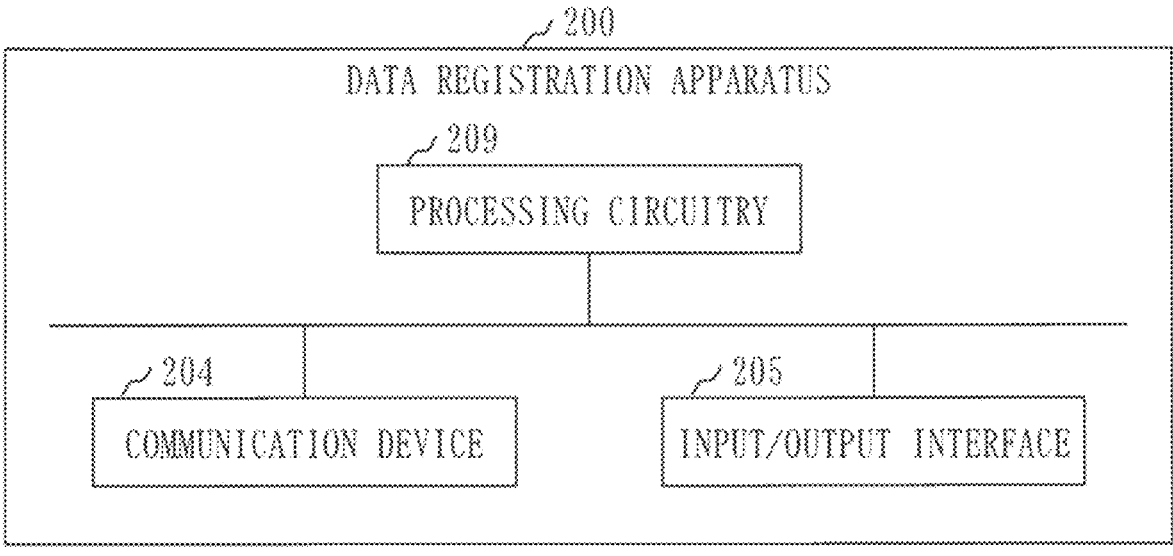
FIG. 29 shows a hardware configuration of the data registration apparatus 200 in an embodiment.

With reference to FIG. 29, a hardware configuration of the data registration apparatus 200 is described.

The data registration apparatus 200 includes processing circuitry 209.

The processing circuitry 209 is hardware that implements the data processing unit 210 and the data management unit 220.

The processing circuitry 209 may be dedicated hardware or may be the processor 201 that executes programs stored in the memory 202.

If the processing circuitry 209 is dedicated hardware, processing circuitry 209 can be a single circuit, a composite circuit, a programmed processor, a parallel programmed processor, an ASIC, an FPGA, or a combination thereof, for example.

ASIC is an abbreviation for Application Specific Integrated Circuit.

FPGA is an abbreviation for Field Programmable Gate Array.

The data registration apparatus 200 may include multiple processing circuits to replace the processing circuitry 209.

In the processing circuitry 209, some functions may be implemented in dedicated hardware and the remaining functions may be implemented in software or firmware.

The functions of the data registration apparatus 200 can thus be implemented in hardware, software, firmware, or a combination thereof.

Figure 30:
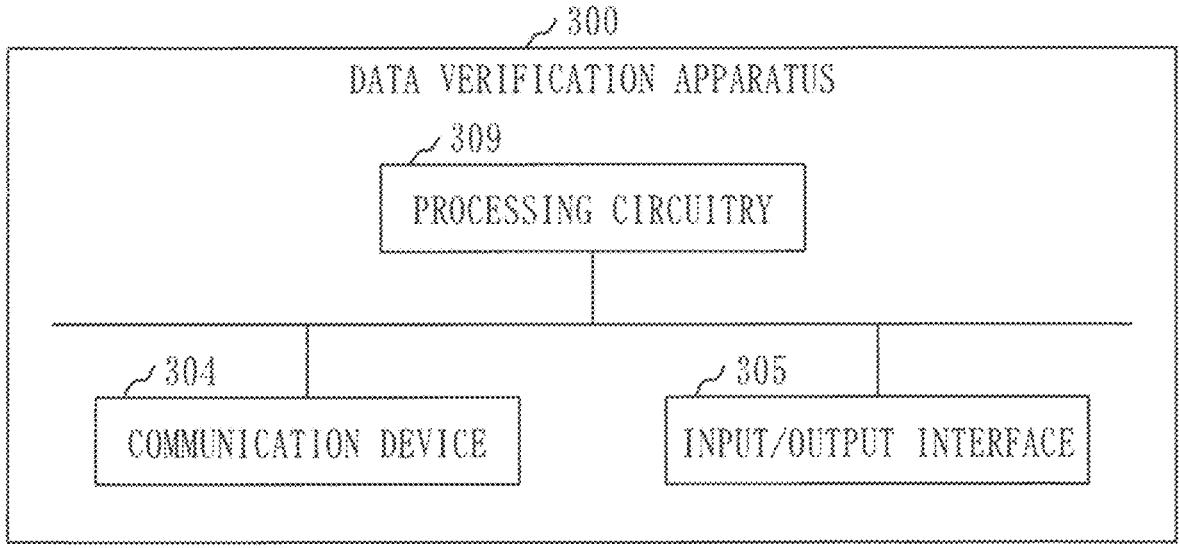
FIG. 30 shows a hardware configuration of the data verification apparatus 300 in an embodiment.

With reference to FIG. 30, a hardware configuration of the data verification apparatus 300 is described.

The data verification apparatus 300 includes processing circuitry 309.

The processing circuitry 309 is hardware that implements the digest value computation unit 310 and the data verification unit 320.

The processing circuitry 309 may be dedicated hardware or may be the processor 301 that executes programs stored in the memory 302.

If the processing circuitry 309 is dedicated hardware, the processing circuitry 309 can be a single circuit, a composite circuit, a programmed processor, a parallel programmed processor, an ASIC, an FPGA, or a combination thereof, for example.

The data verification apparatus 300 may include multiple processing circuits to replace the processing circuitry 309.

In the processing circuitry 309, some functions may be implemented in dedicated hardware and the remaining functions may be implemented in software or firmware.

The functions of the data verification apparatus 300 can thus be implemented in hardware, software, firmware, or a combination thereof.

Figure 31:
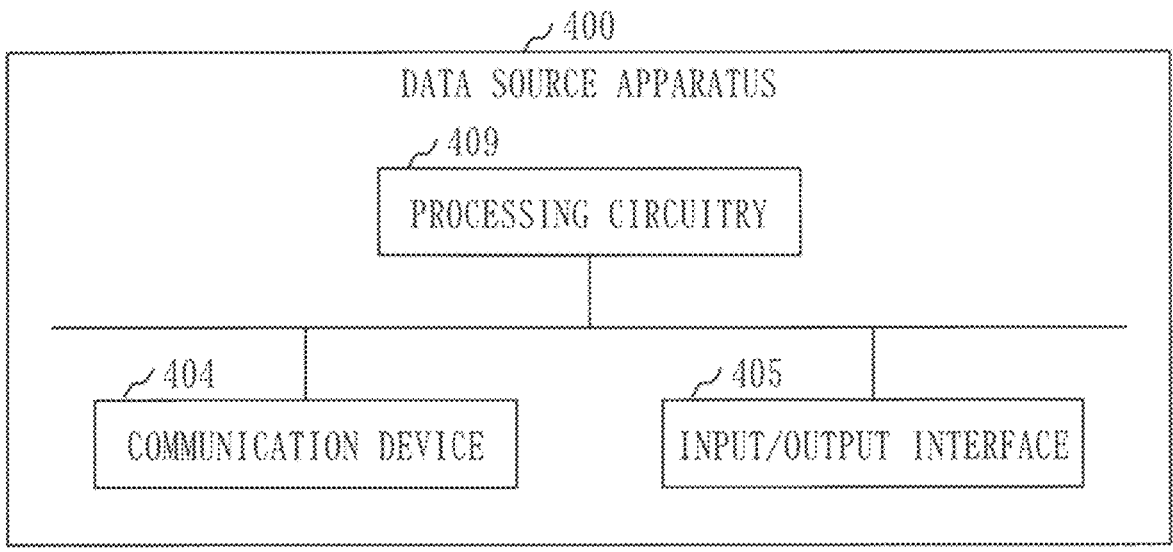
FIG. 31 shows a hardware configuration of the data source apparatus 400 in an embodiment.

With reference to FIG. 31, a hardware configuration of the data source apparatus 400 is described.

The data source apparatus 400 includes processing circuitry 409.

The processing circuitry 409 is hardware that implements the data management unit 410 and the digest value computation unit 420.

The processing circuitry 409 may be dedicated hardware or may be the processor 401 that executes programs stored in the memory 402.

If the processing circuitry 409 is dedicated hardware, the processing circuitry 409 can be a single circuit, a composite circuit, a programmed processor, a parallel programmed processor, an ASIC, an FPGA, or a combination thereof, for example.

The data source apparatus 400 may include multiple processing circuits to replace the processing circuitry 409.

In the processing circuitry 409, some functions may be implemented in dedicated hardware and the remaining functions may be implemented in software or firmware.

The functions of the data source apparatus 400 can thus be implemented in hardware, software, firmware, or a combination thereof.

Figure 32:
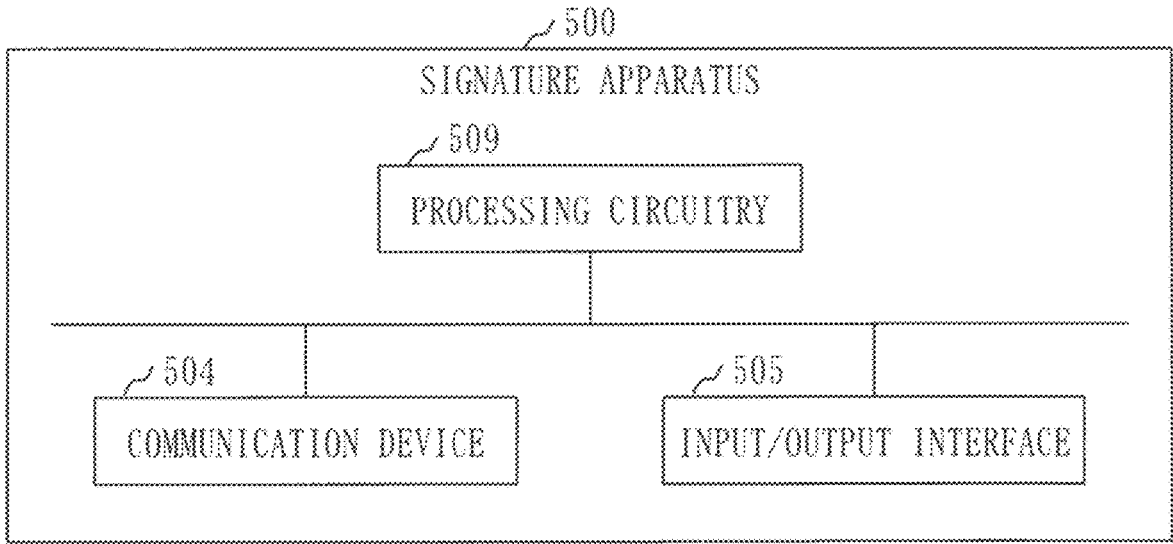
FIG. 32 shows a hardware configuration of the signature apparatus 500 in an embodiment.

With reference to FIG. 32, a hardware configuration of the signature apparatus 500 is described.

The signature apparatus 500 includes processing circuitry 509.

The processing circuitry 509 is hardware that implements the key management unit 510 and the signature unit 520.

The processing circuitry 509 may be dedicated hardware or may be the processor 501 that executes programs stored in the memory 502.

If the processing circuitry 509 is dedicated hardware, the processing circuitry 509 can be a single circuit, a composite circuit, a programmed processor, a parallel programmed processor, an ASIC, an FPGA, or a combination thereof, for example.

The signature apparatus 500 may include multiple processing circuits to replace the processing circuitry 509.

In the processing circuitry 509, some functions may be implemented in dedicated hardware and the remaining functions may be implemented in software or firmware.

The functions of the signature apparatus 500 can thus be implemented in hardware, software, firmware, or a combination thereof.

The embodiments above are illustrative of preferred embodiments and are not intended to limit the technical scope of the present disclosure. The embodiments may be partially practiced or in combination with other embodiments. The procedures discussed with flowcharts and the like may be modified as appropriate.

For the data management system 100, the "unit" of each element of each apparatus may be read as "process", "step", "circuit", or "circuitry".

REFERENCE SIGNS LIST

100: data management system; 101: data maintenance system; 200: data registration apparatus; 201: processor; 202: memory; 203: auxiliary storage device; 204: communication device; 205: input/output interface; 209: processing circuitry; 210: data processing unit; 220: data management unit; 290: storage unit; 291: data store; 300: data verification apparatus; 301: processor; 302: memory; 303: auxiliary storage device; 304: communication device; 305: input/output interface; 309: processing circuitry; 310: digest value computation unit; 311: reference digest value computation unit; 312: provisional digest value computation unit; 320: data verification unit; 390: storage unit; 391: data store; 400: data source apparatus; 401: processor; 402: memory; 403: auxiliary storage device; 404: communication device; 405: input/output interface; 409: processing circuitry; 410: data management unit; 420: digest value computation unit; 490: storage unit; 491: data source; 500: signature apparatus; 501: processor; 502: memory; 503: auxiliary storage device; 504: communication device; 505: input/output interface; 509: processing circuitry; 510: key management unit; 520: signature unit; 590: storage unit

The invention claimed is:

1. A data maintenance system comprising:
first processing circuitry
a data processing unit to retrieve original data saved in a data source, to process the retrieved original data, and to register obtained processed data; and
second processing circuitry
to, during registration of the processed data, compute a digest value of the retrieved original data and a digest value of the processed data, to generate reference combined data based on the computed digest values, and to compute a digest value of the reference combined data as a reference digest value,
to compute a digest value of the registered processed data as a provisional digest value during verification of the processed data, and
to retrieve the digest value of the original data saved in the data source as a provisional digest value, to generate verification combined data based on the provisional digest value of the original data and the provisional digest value of the processed data, to compute a digest value of the verification combined data as a verification digest value, to compare the verification digest value with the reference digest value, and to determine whether the registered processed data is data derived from the original data in the data source.

2. The data maintenance system according to claim 1, wherein
the reference digest value is saved in a data store, and
the second processing circuitry retrieves the reference digest value saved in the data store.

3. The data maintenance system according to claim 1, wherein
an encrypted digest value is saved in a data store, the encrypted digest value being the reference digest value encrypted with a secret key, and
the second processing circuitry retrieves the encrypted digest value saved in the data store, and decrypts the reference digest value from the encrypted digest value using a public key corresponding to the secret key.

4. The data maintenance system according to claim 1, wherein
the reference digest value is saved in the data source, and
the second processing circuitry retrieves the reference digest value saved in the data source.

5. The data maintenance system according to claim 1, wherein
the first processing circuitry processes the original data by executing a data processing program,
the second processing circuitry computes a digest value of the data processing program in addition to the digest value of the original data and the digest value of the processed data, and generates the reference combined data based on the digest value of the original data, the digest value of the processed data, and the digest value of the data processing program,
the second processing circuitry computes a digest value of a registered data processing program as a provisional digest value in addition to the provisional digest value of the registered processed data, and
the second processing circuitry generates the verification combined data based on the provisional digest value of the original data, the provisional digest value of the processed data, and the provisional digest value of the data processing program.

6. The data maintenance system according to claim 5, wherein
the data processing program is registered with the processed data, and
the second processing circuitry retrieves the data processing program registered with the processed data, and computes a digest value of the retrieved data processing program as the provisional digest value of the data processing program.

7. The data maintenance system according to claim 5, wherein
a program identifier identifying the data processing program is registered with the processed data, and
the second processing circuitry retrieves the program identifier registered with the processed data, retrieves the data processing program identified by the retrieved program identifier, and computes a digest value of the retrieved data processing program as the provisional digest value of the data processing program.

8. The data maintenance system according to claim 1, wherein
the second processing circuitry generates the reference combined data by combining the computed digest values.

9. A data maintenance method comprising:

retrieving original data saved in a data source, processing the retrieved original data, and registering obtained processed data;

during registration of the processed data, computing a digest value of the retrieved original data and a digest value of the processed data, generating reference combined data based on the computed digest values, and computing a digest value of the reference combined data as a reference digest value;

computing a digest value of the registered processed data as a provisional digest value during verification of the processed data; and retrieving the digest value that is saved in the data source as the digest value of the original data as a provisional digest value, generating verification combined data based on the provisional digest value of the original data and the provisional digest value of the processed data, computing a digest value of the verification combined data as a verification digest value, comparing the verification digest value with the reference digest value, and determining whether the registered processed data is data derived from the original data in the data source.

10. A non-transitory computer readable medium recorded with a data maintenance program that causes a computer to execute:

a data process of retrieving original data saved in a data source, processing the retrieved original data, and registering obtained processed data;

a reference digest value computation process of, during registration of the processed data, computing a digest value of the retrieved original data and a digest value of the processed data, generating reference combined data based on the computed digest values, and computing a digest value of the reference combined data as a reference digest value;

a provisional digest value computation process of computing a digest value of the registered processed data as a provisional digest value during verification of the processed data; and a data verification process of retrieving the digest value that is saved in the data source as the digest value of the original data as a provisional digest value, generating verification combined data based on the provisional digest value of the original data and the provisional digest value of the processed data, computing a digest value of the verification combined data as a verification digest value, comparing the verification digest value with the reference digest value, and determining whether the registered processed data is data derived from the original data in the data source.

11. A data verification apparatus to verify processed data, the processed data being obtained by processing original data saved in a data source and being registered, the data verification apparatus comprising:

processing circuitry to, during registration of the processed data, compute a digest value of retrieved original data and a digest value of the processed data, to generate reference combined data based on the computed digest values, and to compute a digest value of the generated reference combined data as a reference digest value, to compute a digest value of the registered processed data as a provisional digest value during verification of the processed data, and to retrieve the digest value that is saved in the data source as the digest value of the original data as a provisional digest value, to generate verification combined data based on the provisional digest value of the original data and the provisional digest value of the processed data, to compute a digest value of the generated verification combined data as a verification digest value, to compare the computed verification digest value with the reference digest value, and to determine whether the registered processed data is data derived from the original data in the data source.

* * * * *